(12) United States Patent
Akita et al.

(10) Patent No.: US 7,380,774 B2
(45) Date of Patent: Jun. 3, 2008

(54) HUMIDIFIER

(75) Inventors: Yasuhiro Akita, Nagoya (JP); Shunichi Hayashi, Nagoya (JP); Hiroshi Mizutani, Nagoya (JP); Norio Miwa, Nagoya (JP); Akio Yagi, Nagoya (JP); Takashi Nitta, Nishikasugai-gun (JP); Tadao Takahashi, Nishikasugai-gun (JP); Izumi Tanaka, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 484 days.

(21) Appl. No.: 10/846,606

(22) Filed: May 17, 2004

(65) Prior Publication Data

US 2005/0252982 A1 Nov. 17, 2005

(51) Int. Cl.
*B01F 3/04* (2006.01)
(52) U.S. Cl. .................................. 261/104; 261/119.1
(58) Field of Classification Search ................ 261/101, 261/104, 107, 119.1
See application file for complete search history.

(56) References Cited

U.S. PATENT DOCUMENTS

| | | | | | |
|---|---|---|---|---|---|
| 2,552,887 | A | * | 5/1951 | Demonet et al. | 261/99 |
| 3,355,155 | A | * | 11/1967 | Heltzen et al. | 261/130 |
| 4,098,852 | A | * | 7/1978 | Christen et al. | 261/104 |
| 4,146,597 | A | * | 3/1979 | Eckstein et al. | 261/104 |
| 4,155,961 | A | * | 5/1979 | Benthin | 261/104 |
| 5,318,731 | A | * | 6/1994 | Yokoya et al. | 261/104 |
| 5,399,073 | A | * | 3/1995 | Bauer | 417/313 |
| 6,175,687 | B1 | * | 1/2001 | Imamura et al. | 392/395 |
| 6,367,472 | B1 | * | 4/2002 | Koch | 128/203.12 |
| 2004/0115489 | A1 | * | 6/2004 | Goel | 429/13 |
| 2005/0121812 | A1 | * | 6/2005 | Okada | 261/104 |

FOREIGN PATENT DOCUMENTS

| | | |
|---|---|---|
| JP | 60-171337 | 9/1985 |
| JP | 61-250429 | 11/1986 |
| JP | 2-111377 | 4/1990 |
| JP | 4-366335 | 12/1992 |
| JP | 5-3918 | 1/1993 |
| JP | 6-50581 | 2/1994 |
| JP | 8-100935 | 4/1996 |
| JP | 2003-246832 | 9/2003 |

OTHER PUBLICATIONS

Fujio Hitomi et al., "Moisture-permeable Membrane-type Humidifier", Mitsubishi Denki Giho, vol. 61, No. 5, 1987.

\* cited by examiner

*Primary Examiner*—Scott Bushey
(74) *Attorney, Agent, or Firm*—Wenderoth, Lind & Ponack, L.L.P.

(57) ABSTRACT

A humidifier is superior in terms of hygiene, simple in terms of maintenance, humidity is easily adjusted, and energy consumption is low. The humidifier uses, as a moisture permeable membrane, a moisture-permeable polyurethane obtained by using, as raw materials, at least an isocyanate component, a diol as a chain extender, and polyethylene glycol as a polyol component, and reacting these raw materials.

3 Claims, 20 Drawing Sheets

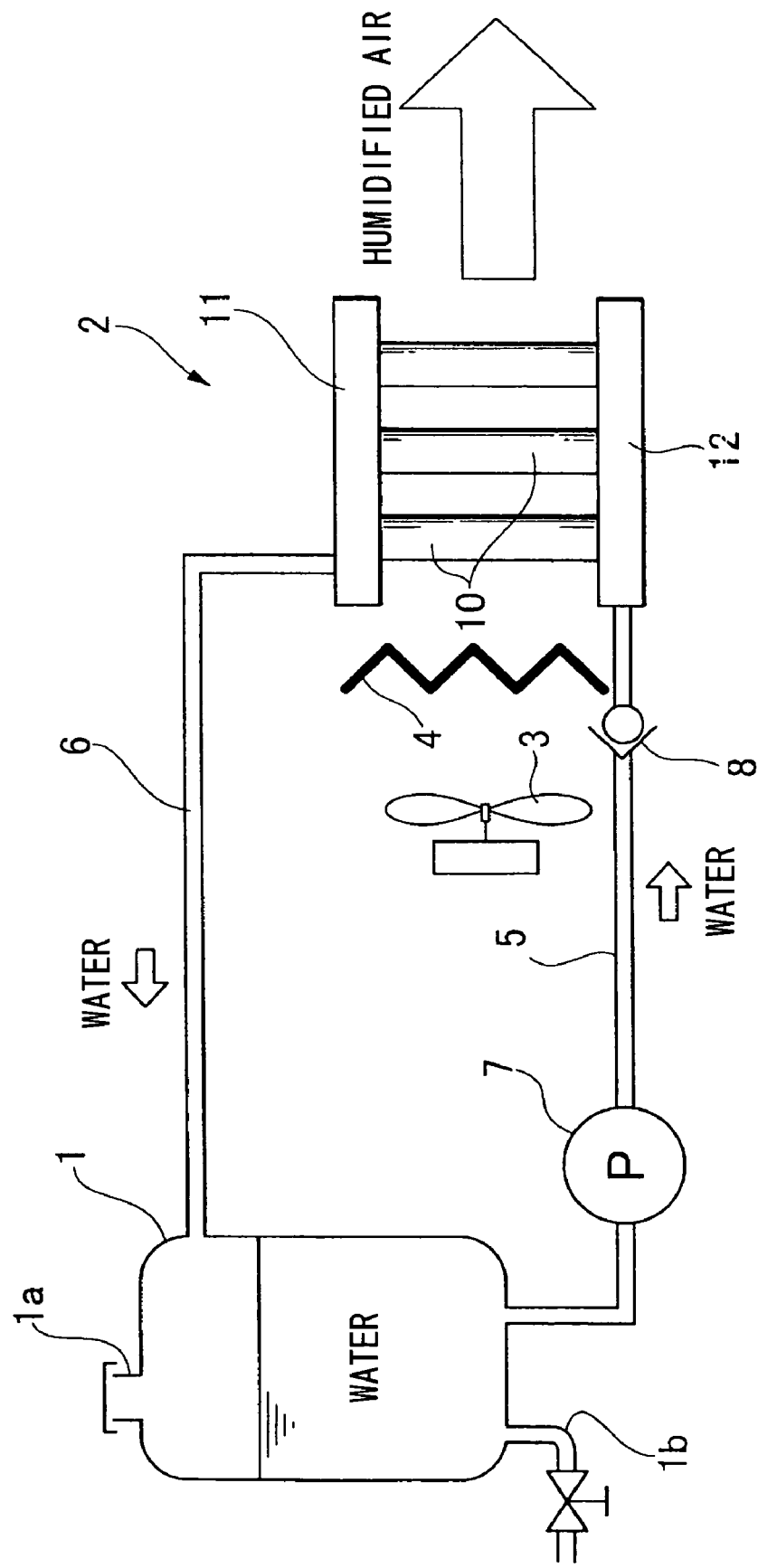

DRY AIR

DRY AIR

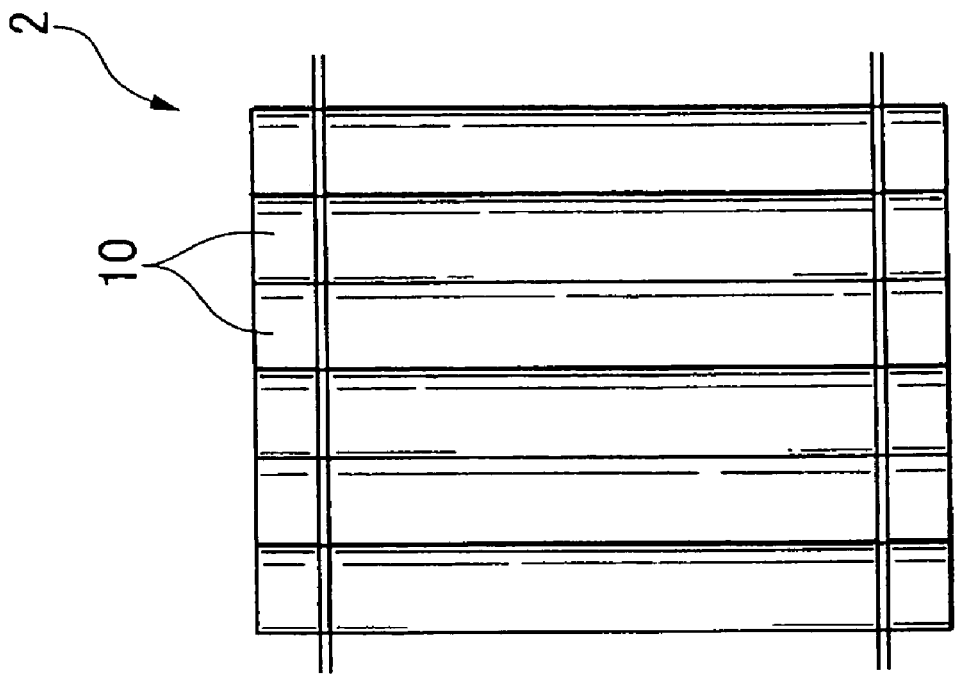
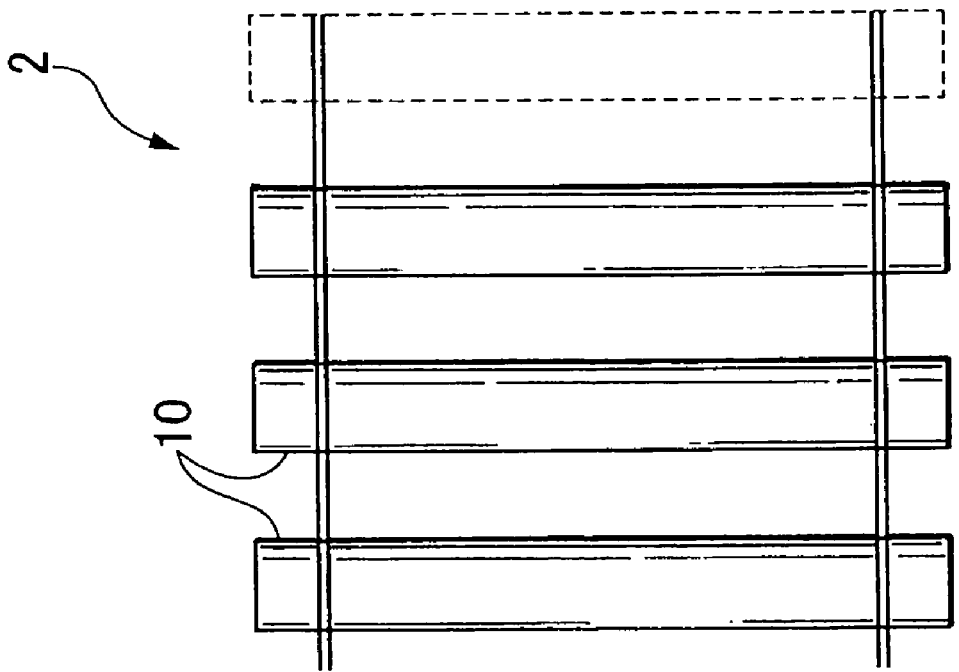

FIG. 20

| Form | Type | Manufacturer | Product name | Product No. | Viscosity | Pot-life | Water leakage |
|---|---|---|---|---|---|---|---|
| Two-pot | Urethane | Sanyu Rec | Sanyu Resin urethane blend resin | SU-2153-9 | 1230 | 120 | no leakage |
| | | | Sanyu Resin urethane blend resin | UF-820 | 200 | 30 | no leakage |
| | | H&K | Injectable polyurethane resin | T-143 | 1500 | 20 | no leakage |
| | Epoxy | Cemedine | Epoxy resin adhesive | 1565 | 1500 | 30 | no leakage |
| | Acrylic | | Acrylic resin adhesive | Y616 | 5000 | 4 | no leakage |
| | Silicone | Toray Dow | RTV silicone rubber | CY51-038RTV | 500 | 20 | some leakage |
| Single-pot | | Corning Silicone | Sealant | SE9186LRTV | 25000 | 7 | some leakage |

HUMIDIFIER

BACKGROUND OF THE INVENTION

1. Field of the Invention

The present invention relates to a humidifier for supplying moisture to any desired space such as the interior of a room and the like, thus raising the humidity, and relates in particular to a humidifier employing moisture-permeable polyurethane as a moisture-permeable membrane.

This application is based on Japanese Patent Applications, Nos. 2001-389560, 2002-208170, and 2002-370808, the contents of which are incorporated herein by reference.

2. Description of Related Art

GORE-TEX (registered trademark), a product comprised of polytetrafluoroethylene (PTFE) resin incorporating innumerable micropores, and polyurethane resin, are known as moisture-permeable resins used in conventional humidifiers. When polytetrafluoroethylene resin is employed, particularly as a fabric, it provides the opposing functions of being waterproof while at the same time being moisture-permeable in that it is impermeable to liquid water while being permeable to water vapor, and is therefore employed in a variety of clothing.

In recent years, the applications of materials having the functions of being waterproof while at the same time being moisture-permeable have expanded, and humidifiers wherein the aforementioned materials are employed to release only a preset amount of clean moisture (water vapor) are under investigation, and have been implemented in some cases.

The related art is disclosed in the documents hereunder.

Japanese Unexamined Patent Application, First Publication No. Hei 08-100935

Japanese Unexamined Patent Application, First Publication No. Sho 60-171337

Japanese Unexamined Patent Application, First Publication No. Sho 61-250429

In humidifiers employing the moisture-permeable resin formed from polytetrafluoroethylene resin, a hollow structure in the shape of a bag formed from layers of the moisture-permeable resin is filled with water, and water vapor is passed through the micropores formed in the moisture-permeable resin. However, it has been pointed out that various bacteria which reproduce both inside and outside the humidifier pass through the micropores with the water vapor and are dispersed in the air, resulting in problems of hygiene.

Furthermore, foreign matter such as calcium deposits and microscopic metal constituents (generally referred to as 'scale') and the like included in the water remain in the interior of the hollow structure, and tend to be gradually concentrated due to the structure of humidifiers wherein only water is evaporated and released. Therefore, the concentrated calcium deposits and foreign matter and the like tend to block the micropores with operation of the humidifier over a long period of time, and once the micropores are blocked, passage of the water vapor deteriorates and the performance of the humidifier deteriorates dramatically. In such cases, since the functions of the humidifier cannot be recovered unless the components employing the moisture-permeable resin are replaced, there is also a problem of the costs of maintenance. These costs increase due to the complex structure of the hollow structure, and are therefore comparatively high.

Moreover, conventional humidifiers require a heater to produce humidified air for the adjustment of humidity. However since considerable energy is consumed in driving a large-capacity heater to generate heat, it is not possible to satisfy consumer requirements in terms of energy-efficiency as desired by the market.

BRIEF SUMMARY OF THE INVENTION

The present invention takes into consideration the aforementioned situation, with an object of providing a humidifier superior in terms of hygiene, simple in terms of maintenance, and wherein humidity is easily adjusted by adjustment of airflow and pump pressurization, and energy consumption is low.

A humidifier having the configuration hereunder is employed as the means for solving the aforementioned problems. That is, a humidifier according to a first aspect of the present invention comprises a moisture-permeable polyurethane obtained by using as raw materials, at least an isocyanate component, a diol as a chain extender, and polyethylene glycol as a polyol component, and reacting these raw materials, and supplies moisture permeating the moisture-permeable polyurethane to an arbitrary space for humidification.

For a humidifier according to a second aspect of the present invention, in the humidifier according to the first aspect of the present invention, the diol as the chain extender is 1,4-butanediol.

For a humidifier according to a third aspect of the present invention, in the humidifier according to the first or second aspect, the polyethylene glycol as the polyol component has a molecular weight of between 600 and 4000.

For a humidifier according to a fourth aspect of the present invention, in the humidifier according to any one of the first, second, and third aspects, the isocyanate component is 4,4'-methylenebisphenyl-isocyanate.

For a humidifier according to a fifth aspect of the present invention, in the humidifier according to any one of the first, second, third, and fourth aspects, a ratio between the chain extender and the polyol component is adjusted to 1 mol of the polyol component to between 1 and 11 mol of the chain extender.

For a humidifier according to a sixth aspect of the present invention, in the humidifier according to any one of the first, second, third, fourth, and fifth aspects, a ratio between the isocyanate component and the polyol component is adjusted to 1 mol of the polyol component to between 2 and 12 mol of the isocyanate component.

For a humidifier according to a seventh aspect of the present invention, in the humidifier according to any one of the first, second, third, fourth, fifth, and sixth aspects, a silicone-type polyol is used as the polyol component in addition to the polyethylene glycol.

For a humidifier according to an eighth aspect of the present invention, the humidifier according to any one of the first, second, third, fourth, fifth, sixth, and seventh aspects comprises a moisture-permeable tube which is made by molding the moisture-permeable polyurethane into a tube to allow water to be supplied to the interior thereof and permeated to the exterior.

For a humidifier according to a ninth aspect of the present invention, in the humidifier according to the eighth aspect, there is provided a pump for supplying the water under pressure to the interior of the moisture-permeable tube.

For a humidifier according to a tenth aspect of the present invention, in the humidifier according to the eighth or ninth aspects, one end of the moisture-permeable tube is positioned higher than an other end of the moisture-permeable tube to allow the water to flow from the other end towards the one end in the moisture-permeable tube.

For a humidifier according to an eleventh aspect of the present invention, in the humidifier according to the eighth or ninth aspects, one end of the moisture-permeable tube is positioned higher than an other end of the moisture-permeable tube to allow the water to flow from the one end towards the other end in the moisture-permeable tube.

For a humidifier according to a twelfth aspect of the present invention, the humidifier according to any one of the first, second, third, fourth, fifth, sixth, and seventh aspects comprises a moisture-permeable tube which is made by molding the moisture-permeable polyurethane into a tube, a portion of the moisture-permeable tube except for both ends being positioned in water to allow water to permeate from the exterior to the interior of the moisture-permeable tube, and to supply air to the interior of the moisture-permeable tube.

For a humidifier according to a thirteenth aspect of the present invention, in the humidifier according to the twelfth aspect, the total length of the moisture-permeable tube is longer than the distance between the both ends.

For a humidifier according to a fourteenth aspect of the present invention, in the humidifier according to any one of the eighth, ninth, tenth, eleventh, and twelfth aspects, there is provided a moisture-permeable module with a plurality of the moisture-permeable tubes connected in parallel.

For a humidifier according to a fifteenth aspect of the present invention, in the humidifier according to any one of the eighth, ninth, tenth, eleventh, twelfth, and thirteenth aspects, the moisture-permeable tubes are positioned so that, as seen from the longitudinal direction of the moisture-permeable tubes, the cross-section of the moisture-permeable tubes forms a plurality of rows.

For a humidifier according to a sixteenth aspect of the present invention, in the humidifier according to the fifteenth aspect, the rows of the moisture-permeable tubes are positioned so that the cross-section of the moisture-permeable tubes as seen from the longitudinal direction is in a wave pattern.

For a humidifier according to a seventeenth aspect of the present invention, in the humidifier according to any one of the eighth, ninth, tenth, eleventh, twelfth, and thirteenth aspects, the moisture-permeable tubes are positioned so that the cross-section of the moisture-permeable tubes as seen from the longitudinal direction of the moisture-permeable tubes is in a staggered pattern.

For a moisture-permeable module according to an eighteenth aspect of the present invention, a moisture-permeable polyurethane obtained by using as raw materials, at least an isocyanate component, a diol as a chain extender, and polyethylene glycol as a polyol component, and reacting these raw materials, is molded into a tube to give a moisture-permeable tube, a plurality of the moisture-permeable tubes are held bundled together, and a portion of the plurality of moisture-permeable tubes except for both ends is positioned in the interior of a water tank.

For a moisture-permeable module according to a nineteenth aspect of the present invention, in the moisture-permeable module according to the eighteenth aspect, the water tank is of a sealed type with a water inlet, both ends of each moisture-permeable tube positioned within the tank are connected to an interior face of the water tank, and the interior of each moisture-permeable tube is exposed to the exterior via holes formed in an exterior face of the water tank.

For a moisture-permeable module according to a twentieth aspect of the present invention, in the moisture-permeable module according to the eighteenth aspect, the water tank is of an open type having the top open, one end of each moisture-permeable module positioned within the water tank is connected to an interior face of the water tank, and the interior of each moisture-permeable tube is exposed to the exterior via holes formed in an exterior face of the water tank.

For a moisture-permeable module according to a twenty-first aspect of the present invention, in the moisture-permeable module according to the eighteenth aspect, a part of the water tank is molded from resin, the ends of the moisture-permeable tubes are bonded together during a process of hardening of the resin, and the interior of each moisture-permeable tube is exposed to the exterior of the water tank via holes formed in part of the water tank.

For a moisture-permeable module according to a twenty-second aspect of the present invention, in the moisture-permeable module according to the twenty-first aspect, a resin body having cylindrical parts communicating with the holes is formed inside the ends of the moisture-permeable tubes to prevent deformation of the moisture-permeable tubes inwards.

For a moisture-permeable module according to a twenty-third aspect of the present invention, in the moisture-permeable module according to the twenty-second aspect, the cylindrical parts communicating with the holes are installed standing on an interior face of the water tank, and the ends of the moisture-permeable tubes are bonded to the cylindrical parts, to thereby connect the moisture-permeable tubes to the water tank.

For a moisture-permeable module according to a twenty-fourth aspect of the present invention, in the moisture-permeable module according to the twenty-third aspect, adhesive is applied to the interior face of the water tank to bond the water tank to the moisture-permeable tube.

For a moisture-permeable module according to a twenty-fifth aspect of the present invention, in the moisture-permeable module according to the twenty-second aspect, adhesive is filled between the cylindrical part and the moisture-permeable tube attached to the cylindrical part to bond both together.

For a humidifier according to a twenty-sixth aspect of the present invention there is provided the moisture-permeable module according to any one of the eighteenth through twenty-fifth aspects to allow water stored in the water tank to permeate from the exterior to the interior of the moisture-permeable tubes, and to supply air to the interior of the moisture-permeable tubes.

In the humidifier of the present invention, at least an isocyanate component, a 1,4-butanediol as the polyol chain extender, and a polyethylene glycol polyol having a molecular weight of between 600 and 4000, are employed as raw materials, and a ratio between the chain extender and the polyol component (chain extender/polyol component) is adjusted to a molar ratio of between one and eleven, and micropores are formed in the moisture-permeable polyurethane obtained by reaction of these raw materials, to pass water at the molecular level. These micropores are not holes existing at the macroscopic level, but are much smaller than the micropores provided in moisture-permeable resin formed from polytetrafluoroethylene such as GORE-TEX (registered trademark) and the like. Various bacteria and scale therefore cannot go through the micropores, and thus deterioration of performance due to dispersal of various bacteria into the air, and blocking of the micropores, can be prevented.

According to the humidifier of the present invention, the moisture-permeable polyurethane allows water only at the molecular level to permeate therethrough, and does not allow various bacteria and scale to pass, thus preventing dispersal of various bacteria into the air, and preventing deterioration of performance due to blockage of the micropores. Moreover, since blockage does not readily occur, the interval between regular or irregular maintenance and replacement of the components formed from the moisture-permeable polyurethane can be extended, and thus excess time and effort, and costs associated with replacement, can be reduced.

Furthermore, according to the present invention, by positioning a plurality of moisture-permeable tubes in rows, escape of the water vapor inside the moisture-permeable module is improved, and moisture permeates smoothly, and thus an increase in efficiency of operation is possible.

According to the present invention, since the amount of moisture permeating through the moisture-permeable tubes can be controlled by adjustment of the output of the pump, it is possible to create the desired humidity environment without a mechanism to heat water with a heater to generate humidified air as in the conventional case.

According to the present invention, by employing air passages within the moisture-permeable module of a wave-pattern shape, turbulence is generated on the surface of the moisture-permeable tubes, and thus air of low moisture content fed sequentially to the moisture-permeable module comes into vigorous contact with the surface of the moisture-permeable tubes, moisture permeates vigorously due to the humidity imbalance between the interior and exterior of the moisture-permeable tubes. Hence, highly efficient operation is possible.

According to the present invention, intersection of the air passages within the moisture-permeable module generates changes in the flow of air fed to the moisture-permeable module, air of low moisture content fed sequentially to the moisture-permeable module comes into vigorous contact with the surface of the moisture-permeable tubes, and moisture permeates vigorously due to the humidity imbalance between the interior and exterior of the moisture-permeable tubes. Moreover, positioning of individual moisture-permeable tubes so that they are not in contact with others also results in vigorous permeation of moisture due to the humidity imbalance between the interior and exterior of the moisture-permeable tubes. Hence highly efficient operation is possible.

According to the present invention, by adopting a structure where a portion of the tubes except for both ends is positioned in water so as to allow water to permeate from the exterior to the interior of the moisture-permeable tubes, and to supply air to the interior of the moisture-permeable tubes, water need only be filled quasistatically in the exterior of the moisture-permeable tubes, and it is not necessary to consider ventilation type pressure losses as with a structure ventilating the exterior of the moisture-permeable tubes. The interval between the moisture-permeable tubes can therefore be reduced, and it is possible to miniaturize the humidifier. Furthermore, air is passed through the tube-shaped moisture-permeable tubes, and since pressure losses are unlikely, the power required for supplying air is reduced, and operation is economical. Moreover, by forming a moisture-permeable module having a sealed water tank, water in the moisture-permeable module does not spill despite rough movement or tipping of the humidifier, and the interior of the apparatus, and the surroundings of its installation, do not become wet. Furthermore, the ability to freely position the moisture-permeable module within the humidifier without consideration of the orientation of the moisture-permeable tubes is beneficial in terms of miniaturizing the humidifier.

According to the present invention, a structure is adopted where water permeates from the exterior of the moisture-permeable tubes to the interior, and air is supplied to the interior of the moisture-permeable tubes. Moreover, the total length of the moisture-permeable tubes is longer than the distance between the fastened positions of both ends. Thus the moisture-permeable tubes themselves, and the fastened positions of both ends, are not subjected to excessive stresses despite deformation due to expansion of the overall length of the moisture-permeable tubes, and durability can therefore be improved.

BRIEF DESCRIPTION OF THE SEVERAL VIEWS OF THE DRAWINGS

FIG. 4 is a drawing showing a second embodiment of the present invention, being a schematic configuration of the humidifier.

FIG. 8A is a side elevation as seen from the direction of inflow of air into the moisture-permeable module 2 in FIG. 7, and FIG. 8B is a side elevation as seen from the direction at right-angles to the direction of inflow of air into the moisture-permeable module 2 in FIG. 7.

FIG. 20 is a table showing the results of leakage verification of a plurality of moisture-permeable modules 2 shown in the eighth embodiment of the present invention, trial-manufactured employing a variety of adhesives 26.

DETAILED DESCRIPTION OF THE INVENTION

A first embodiment of a humidifier according to the present invention is explained with reference to FIG. 1, FIG. 2, FIG. 3A, FIG. 3B, and FIG. 3C.

Figure 1:
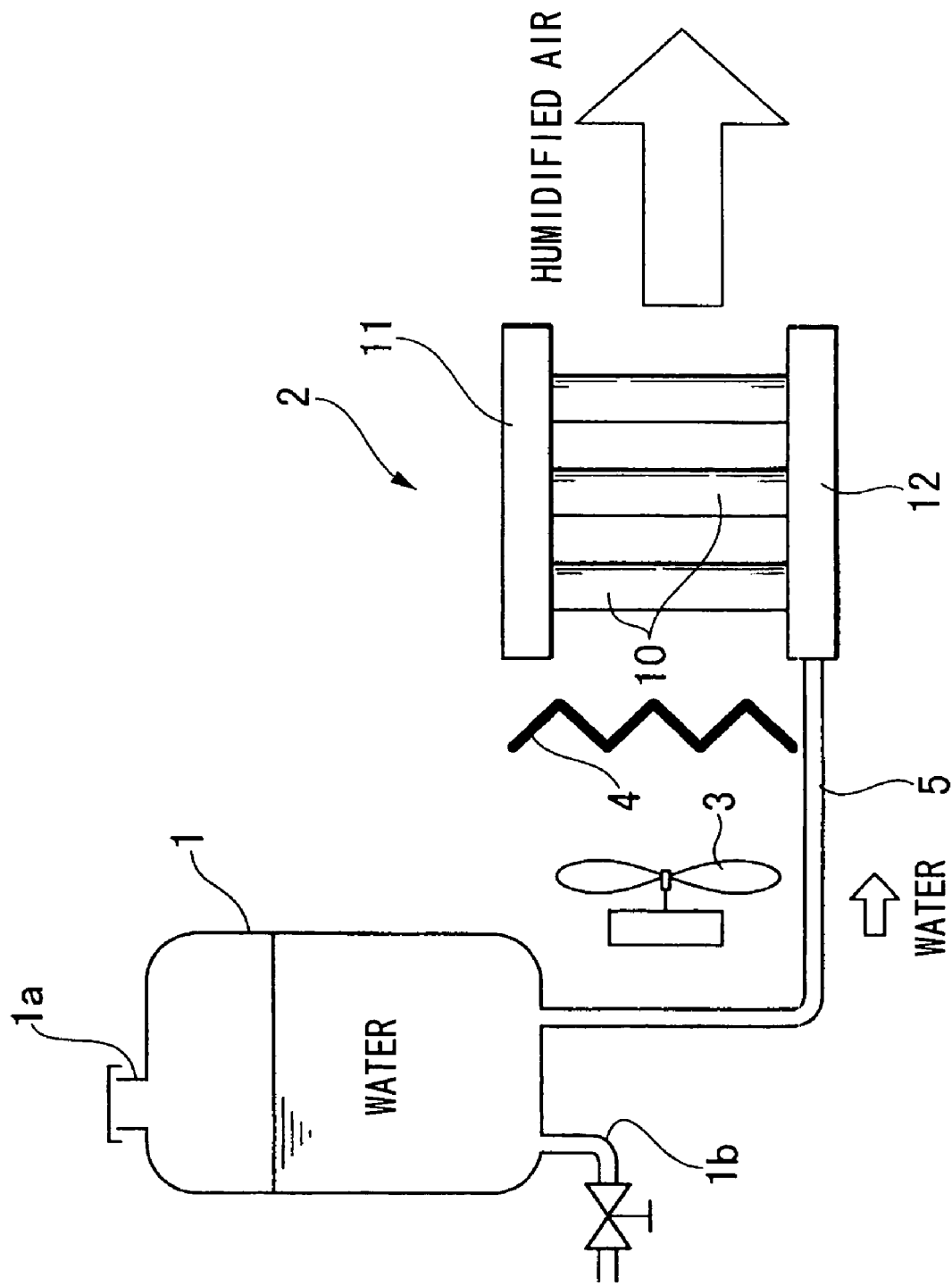
FIG. 1 is a drawing showing a first embodiment of the present invention, being a schematic configuration of a humidifier.

FIG. 1 is a schematic configuration showing the present embodiment of the humidifier. Reference symbol 1 denotes a tank for the storage of water, 2 denotes a humidifier module producing water vapor from water supplied from the tank 1, 3 denotes a fan for the forced supply of water vapor produced with the humidifier module 2 to the room, and 4 denotes a heater for heating air fed to the humidifier module 2 with the fan 3. The tank 1 is positioned at a position higher than the humidifier module 2, and is connected to the humidifier module 2 via a pipe 5, employing the force of gravity acting on the water to supply water to the humidifier module 2.

A water supply port 1a is provided in the top of the tank 1 for the replenishment of water from the exterior, as it is sequentially reduced in association with operation of the humidifier. Moreover, a drain discharge part 1b is provided in the base of the tank 1 for the forced discharge of old water in the tank 1, thus preventing accumulation of pollutants inside the humidifier.

The humidifier module 2 comprises moisture-permeable polyurethane formed into tubes, that is, a plurality of moisture-permeable tubes 10 cut to the same length are prepared and respective ends are connected to headers 11 and 12.

Figure 2:
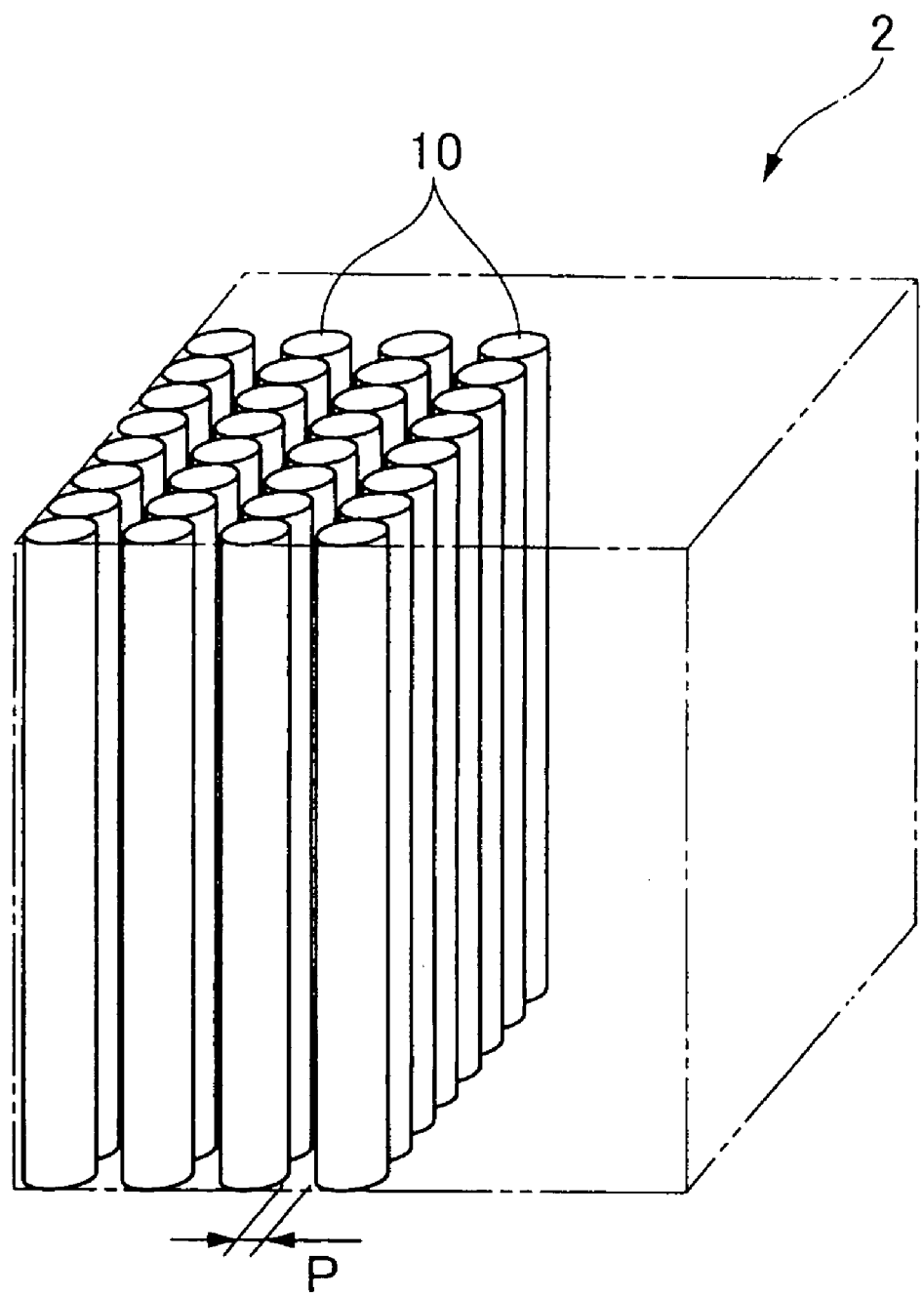
FIG. 2 is a perspective view showing the position of moisture-permeable tubes 10 constituting a moisture-permeable module 2.

As shown in FIG. 2, the cross-section of the multiple moisture-permeable tubes 10 constituting the humidifier module 2 as seen from the length direction, forms a plurality of rows, with each row being positioned at an equidistant spacing P. For example, according to investigations carried out on employment of moisture-permeable tubes of diameters 3 mm, 5 mm, and 8 mm, the desirable spacing P is 2 mm for 3 mm diameter, 3 mm for 5 mm diameter, and 4 mm for 3 mm diameter. The humidifier module 2 is positioned so that a spacing L between the rows matches the direction of the air fed by the fan 3.

Here, the moisture-permeable polyurethane forming the material of the moisture-permeable tubes 10 is obtained by using as raw materials, at least an isocyanate component, a diol component as a chain extender, and a polyol component, and reacting these raw materials.

A variety of conventional materials can be employed as the isocyanate component without particular restriction. For example, 4,4'-methylenebisphenyl-isocyanate (MDI), hexamethylene-diisocyanate, toluene-diisocyanate, cyclohexyl-methane-diisocyanate, and isophorone-isocyanate and the like can be used, however 4,4'-methylenebisphenyl-isocyanate (MDI) is ideal since it is superior in terms of ease-of-handling and workability due to its low vapor pressure, and mechanical properties of the obtained polyurethane are also superior.

1,4-butanediol is employed as the chain extender. For example, ethylene glycol was conventionally employed as the chain extender in moisture-permeable polyurethane resin employed in clothing, however in this case polymerization and molding were conducted in the solvent. The use of 1,4-butanediol in this manner allows the solvent to be dispensed with as explained below. A variety of other raw materials such as diethylene glycol, triethylene glycol, 1,5-pentanediol, and 1,6-hexanediol and the like can be employed as chain extenders in polyurethane. In terms of formability and mechanical properties of the polyurethane obtained, 1,4-butanediol is particularly desirable for use.

Polyethylene glycol (PEG) having a molecular weight of between 600 and 4000 is employed as the polyol component. This is due to the fact that, in comparison to, for example, copolymers of polytetramethylene-glycol (PTMG) or polypropylene-glycol (PPG) with polyethylene-glycol, the moisture-permeability of the polyurethane resin obtained with polyethylene-glycol is superior. Furthermore, molecular weight, that is, weight average molecular weight, is maintained between 600 and 4000 since reactivity is low in excess of 4000, and conversely reactivity is high, and a obtaining a stable polymer copolymer becomes difficult, at less than 600, and permeability is also low and the product may become unusable. Moreover, it is particularly desirable that the molecular weight be between 2500 and 3500. Maintaining the molecular weight within this range ensures a polymer with stable polymeric properties, and satisfactory moisture-permeability of the obtained polyurethane.

In addition to the polyethylene glycol, a silicone-type polyol can be employed as the polyol component. In particular, the use of a denatured polysiloxane-carbinol as shown below having a molecular weight of between 1000 and 3000 is ideal.

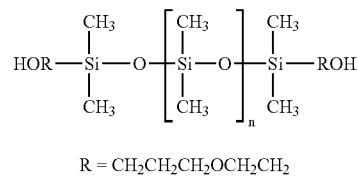

$$R = CH_2CH_2CH_2OCH_2CH_2$$

A small amount of this silicone-type polyol is added to the obtained polyurethane to provide the characteristic of low cohesion between the silicon molecules. The silicon-type polyol ensures good mold release characteristics, in particular when molding the tubes, and is used to reduce tackiness of molded items. The proportion of the polyol component of this silicone-type polyol is between 1% and 70% by weight, the most desirable being between 2% and 4% by weight. If less than 1% by weight, the amount of silicone in the obtained polyurethane is reduced so that the mold release characteristics are good, but a sufficient reduction in tackiness cannot be obtained. If in excess of 70% by weight, the formability and mechanical properties and the like obtained by addition of the expensive silicone-type polyol are saturated. Furthermore, a proportion of between 2% and 4% by weight ensures good mold release characteristics when molding the tubes, tackiness of the molded items is reduced, and sufficient moisture-permeability is obtained.

Moreover, the ratio of the chain extender and polyol component (chain extender/polyol component) in use is adjusted to a molar ratio of between one and eleven, the desirable ratio being between four and ten. When the molar ratio is less than four, the strength of the obtained polyurethane is insufficient, and utility is reduced. When more than ten, the moisture-permeability of the obtained polyurethane is reduced, and polymerization of the polymer becomes difficult. Furthermore, when the molar ratio exceeds four, the strength of the obtained polyurethane is satisfactory and desirable.

The proportion of the isocyanate component in relation to the polyol component is not particularly restricted, however a (isocyanate component/polyol component) molar ratio of between approximately two and twelve is employed, the desirable ratio being between approximately five and eleven. The use of a ratio within this range enables satisfactory polymerization of the polymer, and sufficient strength of the obtained polyurethane.

Moreover, the moisture-permeable polyurethane of the present invention is made by reaction of the isocyanate component, the chain extender, and the polyol component as raw materials. However common urethane formation catalysts, stabilizers, compatibilizing agents, and coloring agents and the like can be added as appropriate.

As explained above, the moisture-permeable polyurethane material of the moisture-permeable tubes 10 employs the isocyanate component, specific chain extender, and polyol component as raw materials, these raw materials being reacted in the appropriate proportions to obtain polymerization without the use of a solvent. The method of reaction is not particularly restricted, and common methods such as the pre-polymer method or the one-shot method and the like may be used.

Polyurethane having this type of moisture-permeability is normally polymerized in a solvent (dimethylformamide and the like). Therefore, when polyurethane is molded into film or the like, this solvent must be removed. In general, since the resin solids content of the solution is approximately 30%, the remaining 70% is solvent and is removed during molding. However, removal of this solvent in the form of a vapor presents treatment problems in consideration of recent environmental requirements such as VOC regulations and the like.

Furthermore, in widely implemented extrusion molding and injection molding, since it is necessary to melt the resin, the molding temperature is increased. Here, molding the resin, which contains a solvent, implies ready generation of the solvent vapor. Since the solvent vapor aggravates the working environment, then due to reasons such as the need for separate equipment to remove the solvent vapor and the like, costs are increased.

Moreover, when raw materials including the 30% of resin solids content as explained above are employed, 70% of the original raw materials are lost in the high-temperature molding process, and the yield is 30%. It is difficult to design and operate molding machinery for such low yields, so that it is difficult to achieve a commercially viable product.

Figure 3A:
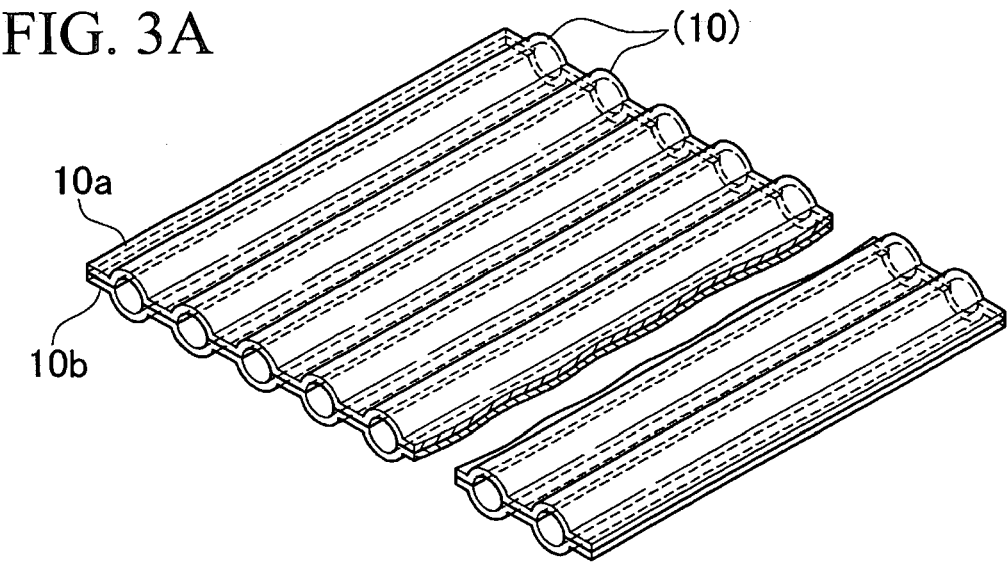
FIG. 3A, FIG. 3B, and FIG. 3C are perspective views showing other examples of molding the moisture-permeable tubes.
Figure 3B:
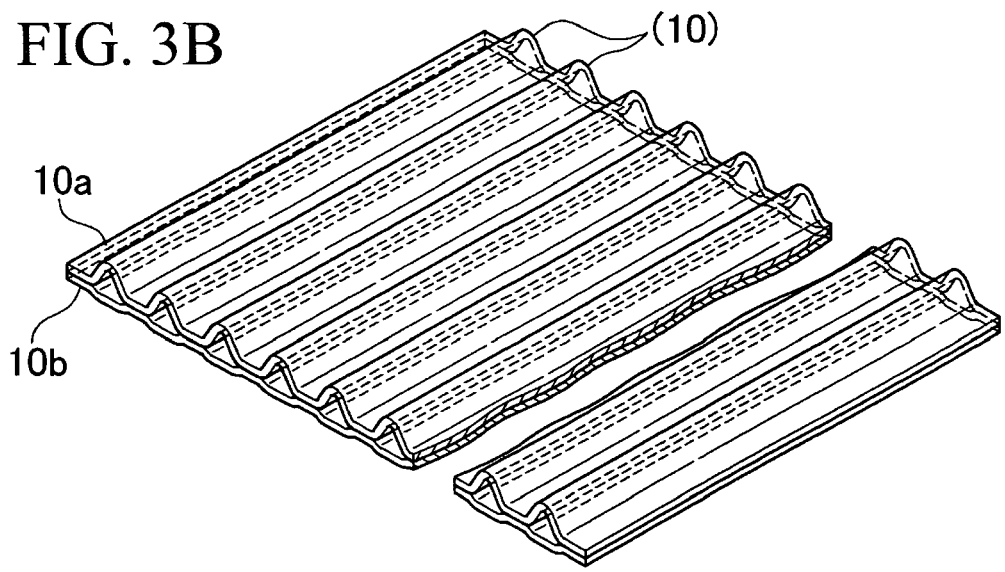
Figure 3C:
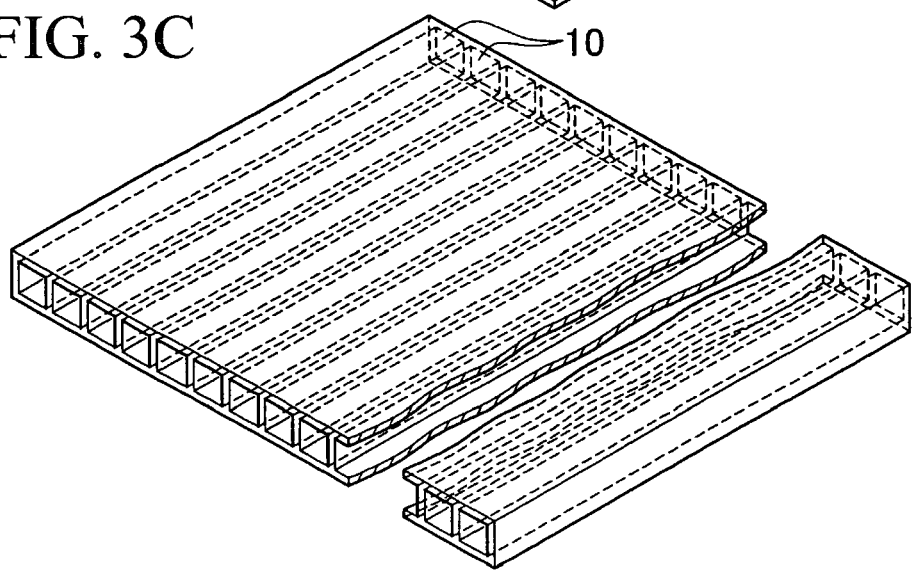

The moisture-permeable polyurethane obtained in this manner has, in itself, satisfactorily high moisture-permeability and mechanical characteristics, as well as satisfactory molding characteristics. By providing satisfactory molding characteristics, pelletizing using common granulation methods is possible for example, and one or more common antibacterial agents, fungicides, and inorganic fillers such as talc and the like, and coloring agents such as pigments and the like can be mixed as desired during pelletizing. Furthermore, a variety of molding methods, for example, extrusion molding methods and the like, are possible with the use of the pellets obtained in this manner. Ideal extrusion-molding methods are hollow extrusion methods employing a mandrel, and molding methods employing an extrusion molding machine. Moreover, in addition to methods of directly molding the tubes, it is also possible to combine as shown in FIGS. 3A and 3B, two sheets of moisture-permeable polyurethane sheet 10a and 10b molded in a thin film by extrusion molding, and heat-seal these together, or as shown in FIG. 3C, to mold a plurality of integrated tubes in one operation by profile extrusion molding. A moisture-permeable module can be formed by overlaying sets of the integrated tubes with each other.

The following explains the method of operation of the humidifier as shown in FIG. 1 and FIG. 2.

When water is placed in the tank 1, water is supplied to the moisture-permeable module 2 using the gravity, that is, by gravity flow, via the pipe 5, and the moisture-permeable tubes 10 are filled with water. With the imbalance in humidity between the interior and exterior of the moisture-permeable tubes 10 as the driving force, the water filling the moisture-permeable tubes 10 permeates to the exterior of the moisture-permeable tubes 10 at the molecular level, as long as the humidity of the exterior of the moisture-permeable tubes 10 is less than the humidity of the interior. The moisture permeating the moisture-permeable tubes 10 becomes water vapor, and is forced from the moisture-permeable module 2 by the air fed by the fan 3, becomes humidified air, and is supplied to any desired space.

Since the humidifier explained above can convert liquid water into water vapor without operation of the heater 4, it has the major advantages of exhibiting a moderate performance while being able to create an environment of natural humidity indoors, and without wasted consumption of energy.

The heater 4 of the present embodiment is operated when the capacity of the humidifier is to be adjusted. As explained above, if the humidity of the interior and exterior of the moisture-permeable tubes 10 is balanced, water does not permeate. However, when an attempt is made to raise the humidity further from this condition, operation of the heater 4 heats and dries the air fed to the moisture-permeable module 2 by the fan 3, thus reducing the relative humidity, the humidity on the exterior of the moisture-permeable tubes 10 becomes less than that of the interior, and water permeates creating water vapor. If the extent of heating with the heater 4 is adjusted, it is possible to create the required humidity environment.

In a humidifier having a structure as explained above, the moisture-permeable tubes 10 allow water at the molecular level to permeate there through, but not bacteria and scale, and thus dispersion of bacteria in the air is prevented, and deterioration of performance resulting from blockage of the micropores can be prevented. At the same time, since blockage does not occur, cleaning and replacement of the moisture-permeable module 2 is unnecessary, and extra work and costs are reduced.

Furthermore, in comparison to conventional humidifiers employing moisture-permeable resin formed from polytetrafluoroethylene, the moisture-permeable tubes of the present invention are rigid in themselves. Therefore, the moisture-permeable module 2 which generates the water vapor does not require reinforcing members, spacers, and the like to support the moisture-permeable materials. The structure is therefore simple in that it comprises only the moisture-permeable tubes, and hence manufacturing costs are low and handling during assembly is simple.

Moreover, in the humidifier, by positioning the plurality of rows of moisture-permeable tubes 10 as shown in FIG. 2, water vapor within the moisture-permeable module 2 is readily able to escape, allowing for smooth permeation of moisture. Thus highly efficient operation is possible.

Next, a second embodiment of a humidifier according to the present invention is explained with reference to FIG. 4. Components already explained in the aforementioned embodiment are labeled with the same reference symbols and explanation is omitted.

In the present embodiment, a structure is employed wherein water is introduced into the bottom of the moisture-permeable module 2 and drawn from the top, and is circulated between the tank 1 and the moisture-permeable module 2. More specifically, in addition to the pipe for the supply of water from the tank 1 to the moisture-permeable module 2, a pipe 6 is provided for returning water from the moisture-permeable module 2 to the tank 1.

A pressurizing pump 7 to feed water in the tank 1 to the moisture-permeable module 2 is provided in the pipe 5. Furthermore, to prevent unnecessary water entering or leaving the moisture-permeable module 2, a valve 8 is provided in the pressurizing pump 7 to oppose the backflow. One end of the pipe 5 is connected to the base of the tank 1, and the other end of the pipe 5 is connected to the bottom header 12 constituting the moisture-permeable module 2. One end of the pipe 6 is connected to the top header 11, and the other end of the pipe 6 is connected to the top of the tank 1.

In the humidifier having such a structure, in addition to obtaining the same effect as the first embodiment, it is possible to adjust the capacity of the humidifier by pressurizing the supply of water. Since the moisture-permeable tubes 10 have a characteristic whereby the amount of moisture permeating changes in response to the pressure of the water supplied to the interior, humidity is increased by increasing the output of the pump 7, thus increasing the pressure of the water supplied to the moisture-permeable module 2, increasing the amount of moisture permeating, and creating more water vapor. Moreover, if the output of the pressurizing pump is adjusted, it is possible to create the required humidity environment. In the present embodiment, therefore, a heater 4 is provided in parallel to adjust humidity. However a structure is also possible whereby the heater is eliminated and humidity is adjusted solely with the pressurizing pump 7.

In conventional humidifiers employing moisture-permeable resin formed from polytetrafluoroethylene, the hollow structure to which the moisture-permeable resin is applied in sheet form, is such that application of a high pressure to the water applies a mechanical load to the hollow structure, and may result in rupture in some cases. In conventional humidifiers, therefore, either the pressure able to be applied to the water is restricted to a predetermined maximum value, or a structure is adopted wherein humidity is adjusted with a heater 4 without application of pressure to the water. In the humidifier of the present embodiment, the heater 4 consuming a comparatively large amount of energy is omitted and energy-saving operation can be realized.

The pressurizing pump 7 need not be provided in the pipe 5. For example, if a submersible pump is employed, it is possible to provide the pressurizing pump 7 inside the tank 1 (near the tank base). Furthermore, in place of the pressurizing pump 7, it is also possible to provide a heating device to heat the water and raise the vapor pressure.

Figure 5:
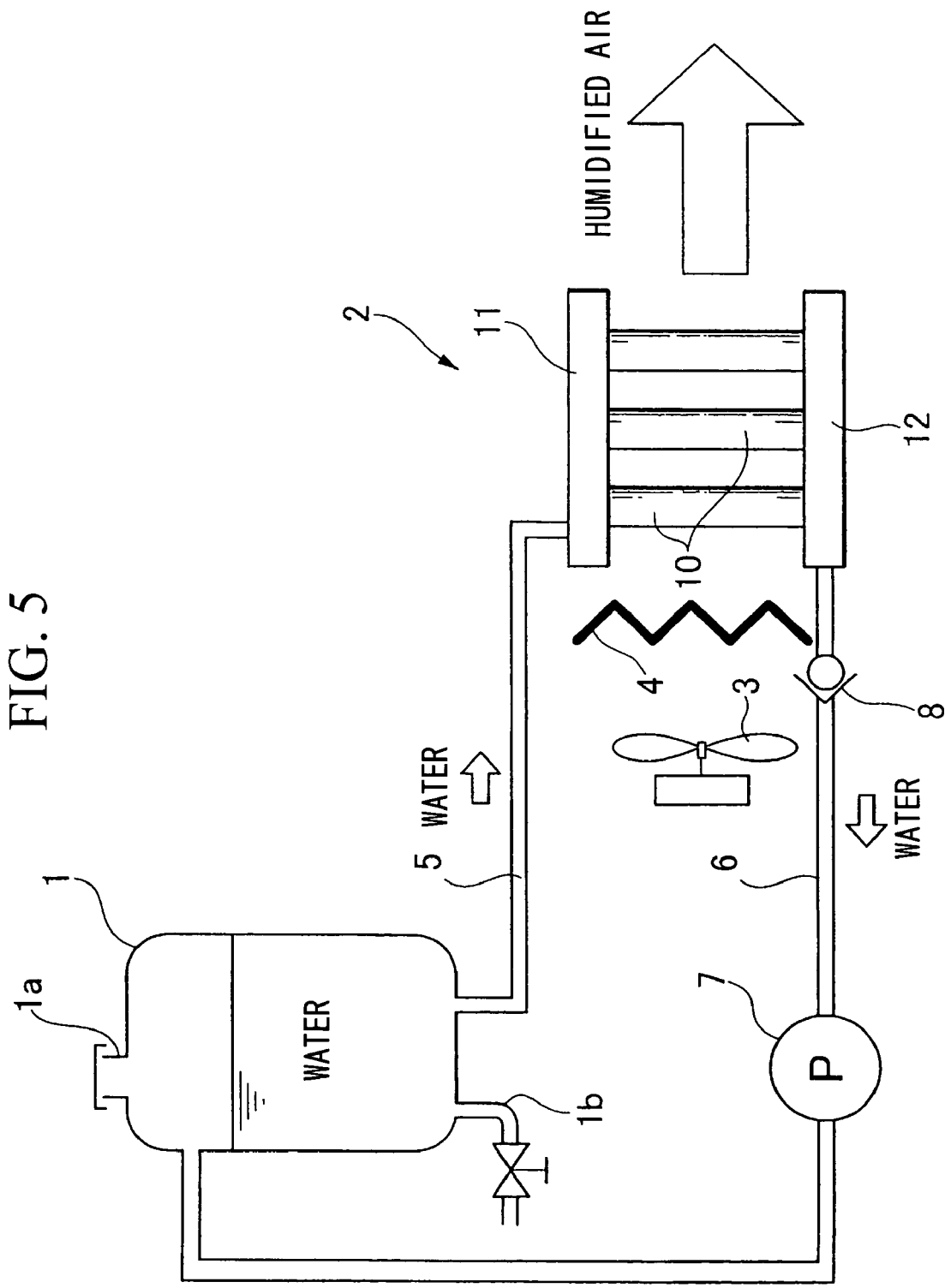
FIG. 5 is a drawing showing a third embodiment of the present invention, being a schematic configuration of the humidifier.

Next, a third embodiment of a humidifier according to the present invention is explained, with reference to FIG. 5. Components already explained in the aforementioned embodiments are labeled with the same reference symbols and explanation is omitted.

In the present embodiment, as with the second embodiment, water is circulated between the tank 1 and the moisture-permeable module 2. However in contrast to the second embodiment having a structure wherein water is introduced at the bottom of the moisture-permeable module 2 and drawn from the top, the present embodiment has a structure wherein water is introduced at the top of the moisture-permeable module 2 and drawn from the bottom. More specifically, one end of the pipe 5 is connected to the bottom of the tank 1, the other end of the pipe 5 is connected to the top header 11 constituting the moisture-permeable module 2, one end of the pipe 6 is connected to the bottom header 12, and the other end of the pipe 6 is connected to the top of the tank 1. Moreover, the pressurizing pump 7 is installed in the pipe 6 rather than in the pipe 5.

In the humidifier having such a structure, the same effect is obtained as in the second embodiment.

Figure 6:
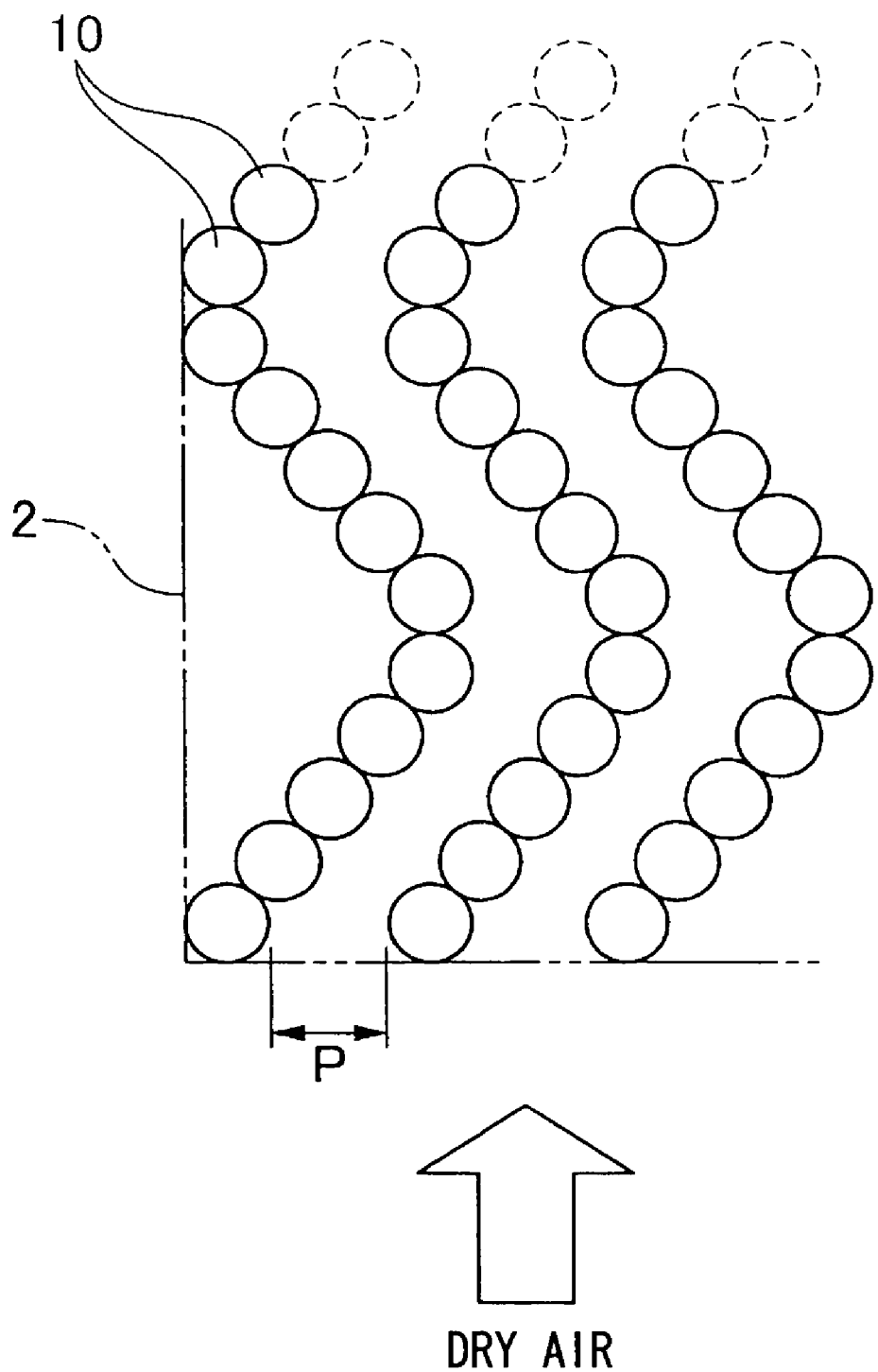
FIG. 6 is a drawing showing a fourth embodiment of the present invention, being a plan cross-section showing the position of the moisture-permeable tubes 10 constituting the moisture-permeable module.

Next, a third embodiment of the humidifier according to the present invention is explained, with reference to FIG. 6. The present embodiment is related to the structure of the moisture-permeable module 2, and as such may be applied to each of the embodiments. In the present embodiment also, components already described are labeled with the same reference symbols and further explanation omitted.

In the moisture-permeable module 2 of the present embodiment, a plurality of moisture-permeable tubes 10 forms a cross-section having a plurality of rows as seen from the longitudinal direction of the moisture-permeable tubes 10 themselves, with each row positioned in a wave pattern. Furthermore, each row of waves is positioned in parallel with, and a fixed distance P from, the adjacent row, and the path along which the air flows as seen in plan view is in a wave pattern.

In the humidifier provided with the moisture-permeable module 2 having such a structure, the path of the airflow within the moisture-permeable module 2 is in a wave pattern, thus creating changes in the flow of the air fed to the moisture-permeable module 2. Since turbulence occurs on the surface of the moisture-permeable tubes 10, the layer of water vapor swirling around the moisture-permeable tubes 10 is peeled off and separated, and low-humidity air fed sequentially comes into vigorous contact with the surface of the moisture-permeable tubes 10. As a result, moisture is permeated vigorously due to the humidity imbalance between the interior and exterior of the moisture-permeable tubes 10. Thus highly efficient operation is possible.

Figure 7:
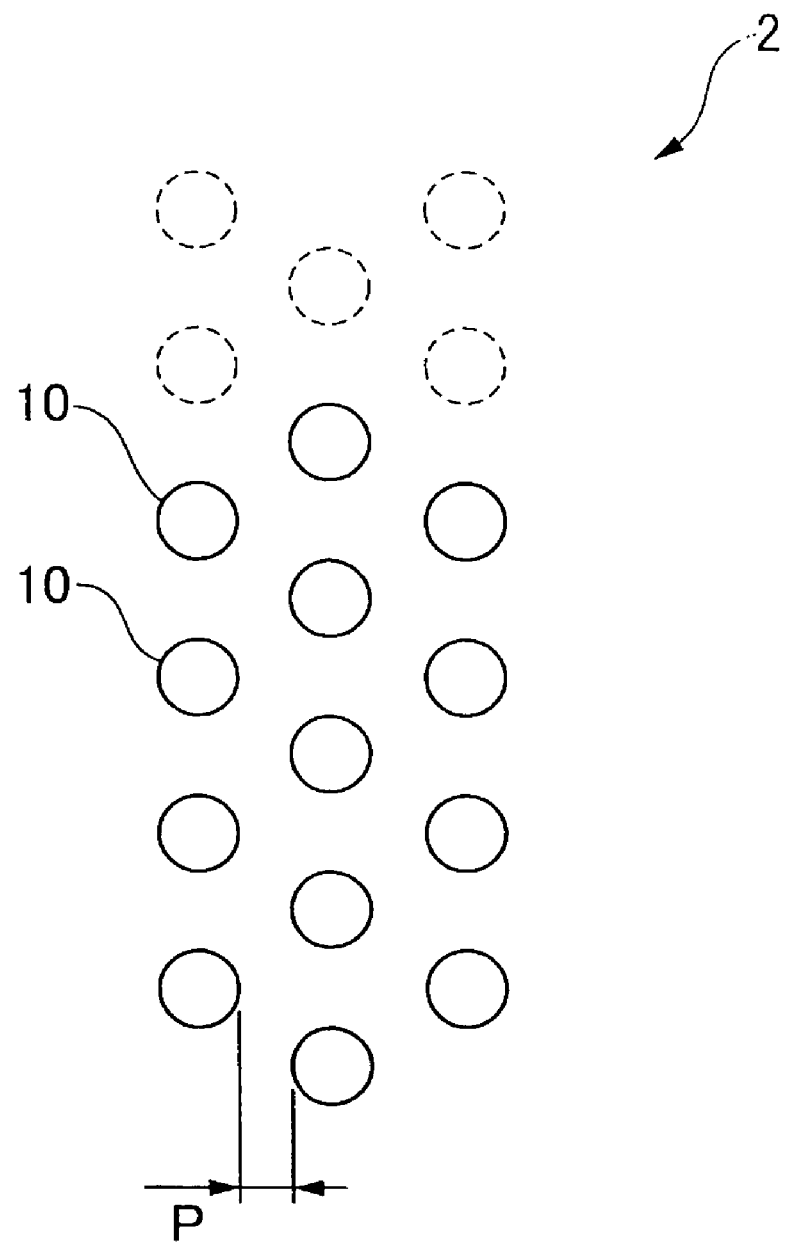
FIG. 7 is a drawing showing a fifth embodiment of the present invention, being a plan cross-section showing the position of the moisture-permeable tubes 10 constituting the moisture-permeable module.

Next, a fifth embodiment of a humidifier according to the present invention is explained, with reference to FIG. 7, FIG. 8A, and FIG. 8B. The present embodiment is also related to the structure of the moisture-permeable module 2, and as such may be applied to all of the humidifiers explained in each of the embodiments. In the present embodiment also, components already described are labeled with the same reference symbols and further explanation omitted.

In the moisture-permeable module 2 of the present embodiment, a plurality of moisture-permeable tubes 10 are positioned to form a cross-section in a staggered pattern as seen from the longitudinal direction as shown in FIG. 7. With this positioning, the spacing P between rows in the direction of the airflow is equidistant (see FIG. 8A), and adjacent front and rear moisture-permeable tubes 10 are offset as seen from a direction at right angles to the direction of the airflow, so that there are almost no gaps (see FIG. 8B).

In the humidifier provided with the moisture-permeable module 2 having such a structure, the paths of the airflow within the moisture-permeable module 2 intersect, creating changes in the flow of the air fed to the moisture-permeable module 2. Since turbulence occurs on the surface of the moisture-permeable tubes 10, the layer of water vapor swirling around the moisture-permeable tubes 10 is peeled off and separated, and low-humidity air fed sequentially comes into vigorous contact with the surface of the moisture-permeable tubes 10. Moreover, since individual adjacent moisture-permeable tubes 10 are positioned so that they do not contact each other, the area of contact between the air fed to the moisture-permeable module 2 and the surface of the moisture-permeable tubes 10 is increased. As a result, moisture is permeated vigorously due to the humidity imbalance between the interior and exterior of the moisture-permeable tubes 10. Thus highly efficient operation is possible.

There are no restrictions to the staggered structure. In consideration of uniform airflow and convenience of manufacture, it is desirable to employ a triangular arrangement having a stagger angle of 30° or 60°, or a quadrilateral arrangement having an angle of 45° or 90°.

Furthermore, in each of the embodiments, the array of moisture-permeable tubes 10 is positioned so that the section of the moisture-permeable tubes 10 is in a wave pattern or in a staggered pattern. However the arrangement of the moisture-permeable tubes 10 is not restricted to this, and other forms, for example, a radial coaxial circular form, is also possible.

Figure 9:
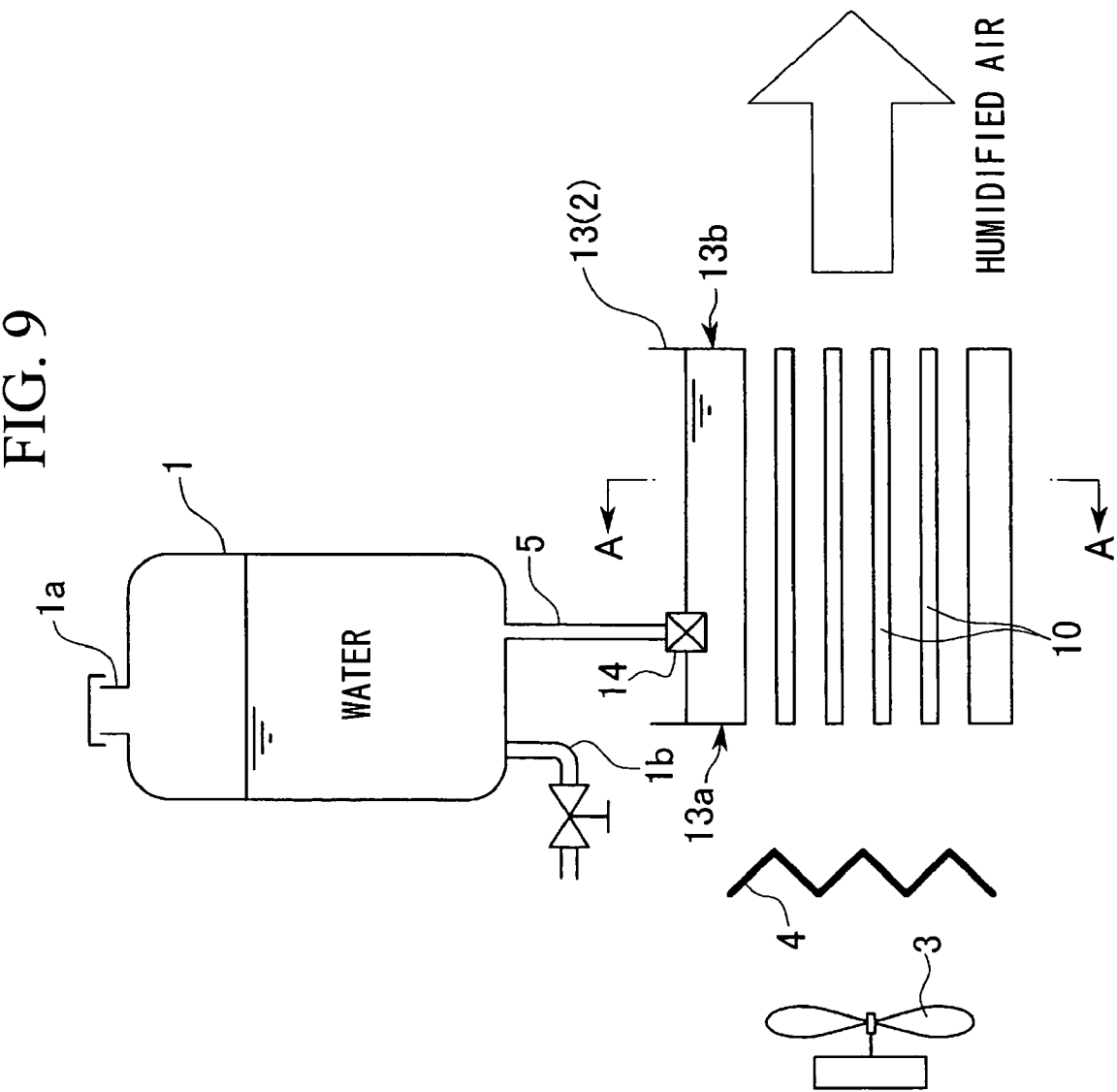
FIG. 9 is a drawing showing a sixth embodiment of the present invention, being a schematic configuration of the humidifier.
Figure 10:
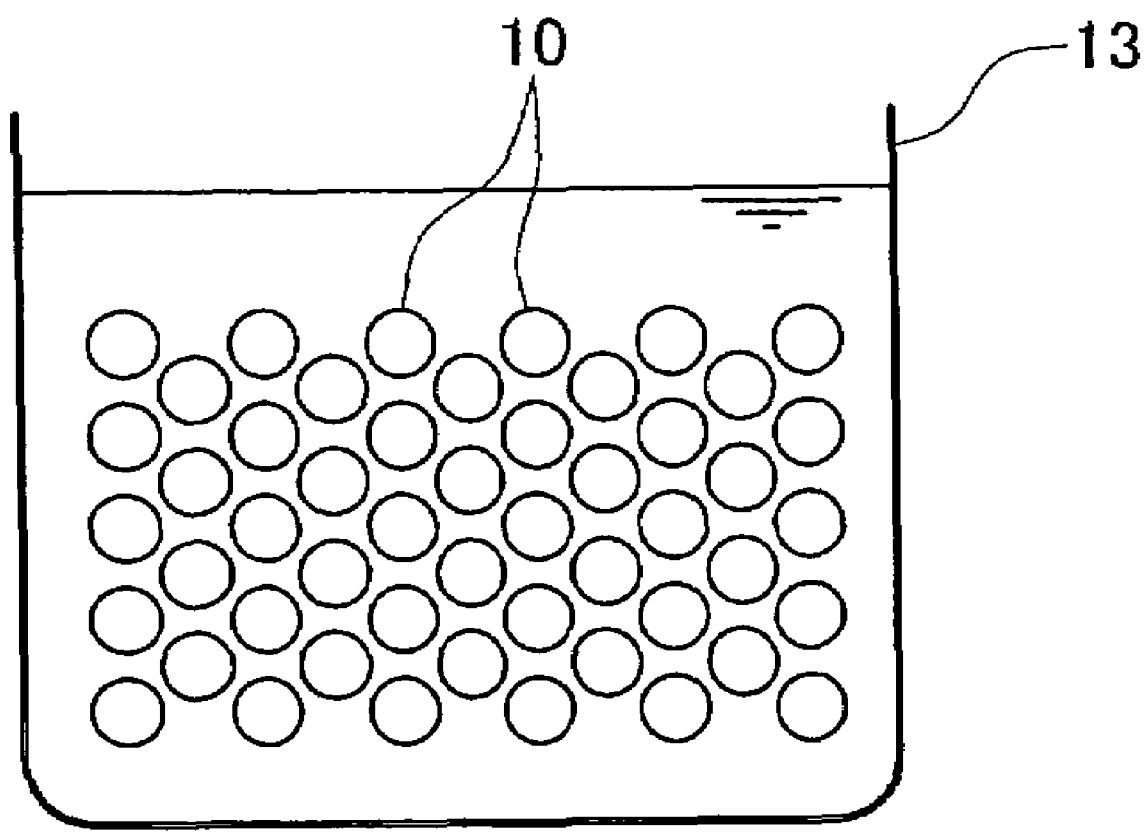
FIG. 10 is a section along the line A-A in FIG. 9.

Next, a sixth embodiment of a humidifier according to the present invention is explained, with reference to FIG. 9 and FIG. 10. In the present embodiment also, components already described are labeled with the same reference symbols and further explanation omitted.

The present embodiment differs from each of the above-described embodiments in that the structure brings water in contact with the exterior of the moisture-permeable tubes 10, allowing moisture to permeate to the interior, and supplies air to the interior of the moisture-permeable tubes 10 to create humidified air. As shown in FIG. 9, the humidifier of the present embodiment provides, in addition to a tank 1, a water tank 13 with an integral moisture-permeable module 2. In the water tank 13, one end of each moisture-permeable tube 10 is fastened to one side face 13a and the other end of the same moisture-permeable tube 10 is fastened to the other side face 13b, and each of these moisture-permeable tubes 10 is arranged linearly across the interior of the tank.

The moisture-permeable tubes 10 are open at both side faces 13a and 13b, and it is possible to pass air through the interior. In the water tank 13, the plurality of moisture-permeable tubes 10 are parallel to the horizontal direction when seen from one side, and densely arrayed in a staggered pattern as shown in FIG. 10 when seen from another side.

The tank 1 is positioned above the water tank 13 and water is supplied to the water tank 13 by gravity. The pipe 5 supplying water to the tank 13 is extended to a prescribed water level set in the water tank 13, and a float valve 14 is provided in the tip so that the water supply is shut-off when the water supplied to the water tank 13 reaches the prescribed water level.

The fan 3 and the heater 4 are positioned at one end in the length direction of the moisture-permeable tubes 10 provided in the water tank 13, and the heated air is fed from the openings at one end of the moisture-permeable tubes 10 to supply air to the interior of the moisture-permeable tubes 10.

The following explains the method of operation of the humidifier as shown in FIG. 9 and FIG. 10.

When water is placed in the tank 1, water is supplied to the water tank 13 using the gravity, that is, by gravity flow, via the pipe 5. When the water level in the water tank 13 reaches the prescribed level, the float 14 lifts the valve body (not shown in the drawing), and closes the pipe 5 to stop the supply of water. Using the imbalance in humidity between the interior and exterior of the moisture-permeable tubes 10 as the driving force, the water filling the water tank 13 permeates to the interior of the moisture-permeable tubes 10 at the molecular level, as long as the humidity of the exterior of the moisture-permeable tubes 10 is less than the humidity of the interior. The moisture permeating the moisture-permeable tubes 10 becomes water vapor, and is forced from the moisture-permeable tubes 10 by the air fed by the fan 3, becomes humidified air, and is supplied to any desired space. As operation continues, the float valve opens as necessary to supply water from the tank 1 to the water tank 13 so that, despite use of the water in the water tank 13, the water level in the water tank 13 is maintained at a constant level provided that the water in the tank 1 is not exhausted.

In the humidifier having such a structure, in addition to obtaining the same effect as the aforementioned embodiments, it is possible to miniaturize the humidifier itself by miniaturizing the moisture-permeable module 2. For example, in the first embodiment, the moisture-permeable tubes 10 must be widely spaced to ensure ventilation of the moisture-permeable module 2. This is because, if the spacing is narrow pressure loss is increased, and ventilation of the moisture-permeable module 2 is not as desired. Conversely, in the present embodiment, the relationship between water supply and ventilation is reversed, so that the water is only filled quasistatically around the exterior of the bundled moisture-permeable tubes 10. Therefore, there is no need to consider pressure losses during ventilation as in the first embodiment. Since the spacing between the moisture-permeable tubes 10 can be reduced, then for a humidifier obtaining the same performance, a smaller moisture-permeable module 2 is possible with the humidifier of the present embodiment, than is the case with a humidifier of the first embodiment, and the humidifier itself can therefore be reduced in size.

Moreover, in the humidifier of the present embodiment, almost linear ventilation through the moisture-permeable tubes 10 of circular section is possible, and pressure losses are therefore unlikely, so that even with a similar flow, fan 3 drive is reduced and operation is economical.

In the present embodiment the moisture-permeable tubes 10 are positioned in a staggered pattern. However this positioning is not restricted to a staggered pattern, and a variety of patterns can be employed (for example, FIG. 2). Moreover, in the present embodiment, a structure is employed wherein the tank 1 is positioned above the water tank 13, and the force of gravity is used to supply water.

However a structure wherein the tank 1 is positioned at the same level as the water tank 13, and water is supplied by force using pump drive, may also be employed.

Figure 11:
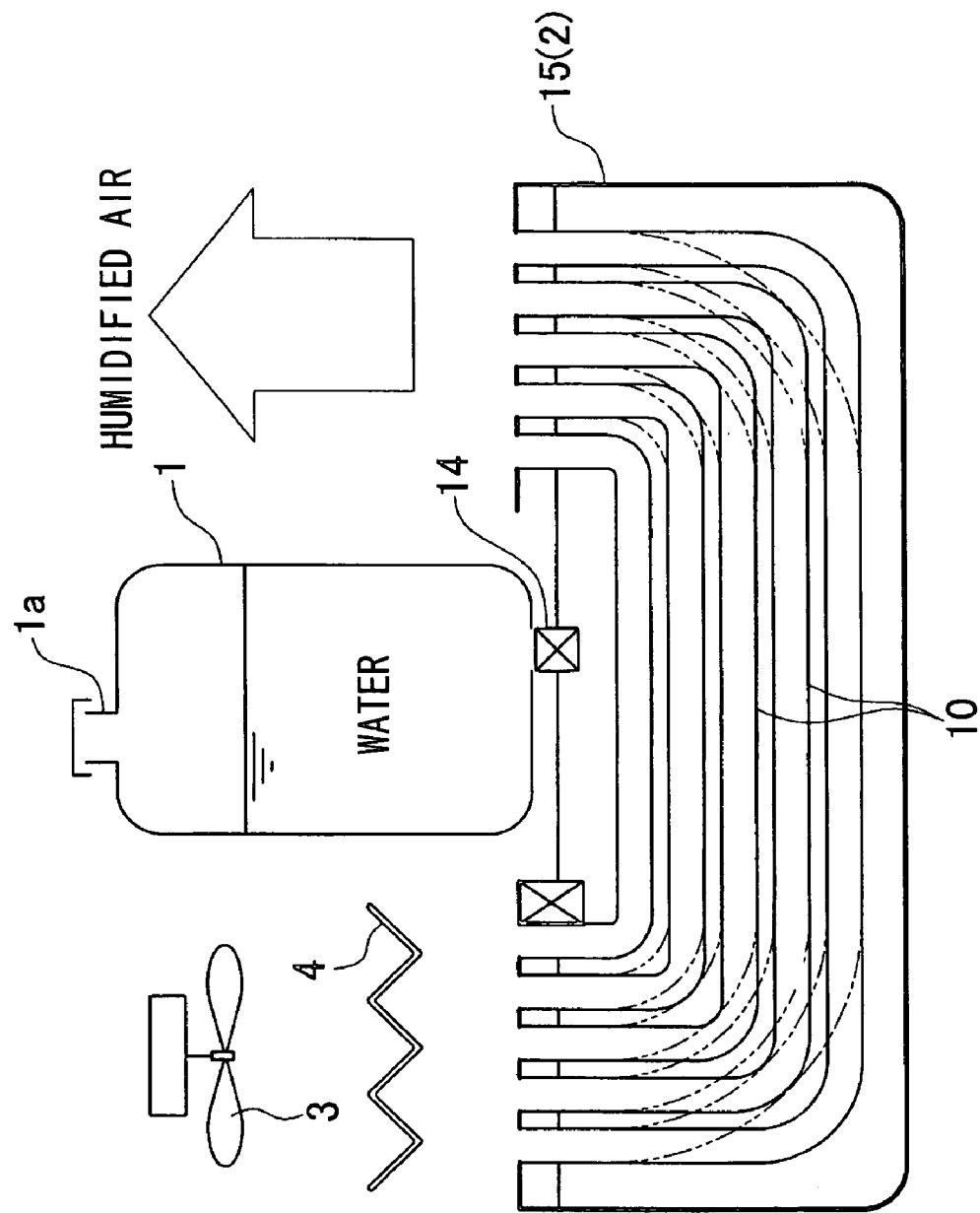
FIG. 11 is a drawing showing a seventh embodiment of the present invention, being a schematic configuration of the humidifier.
Figure 12:
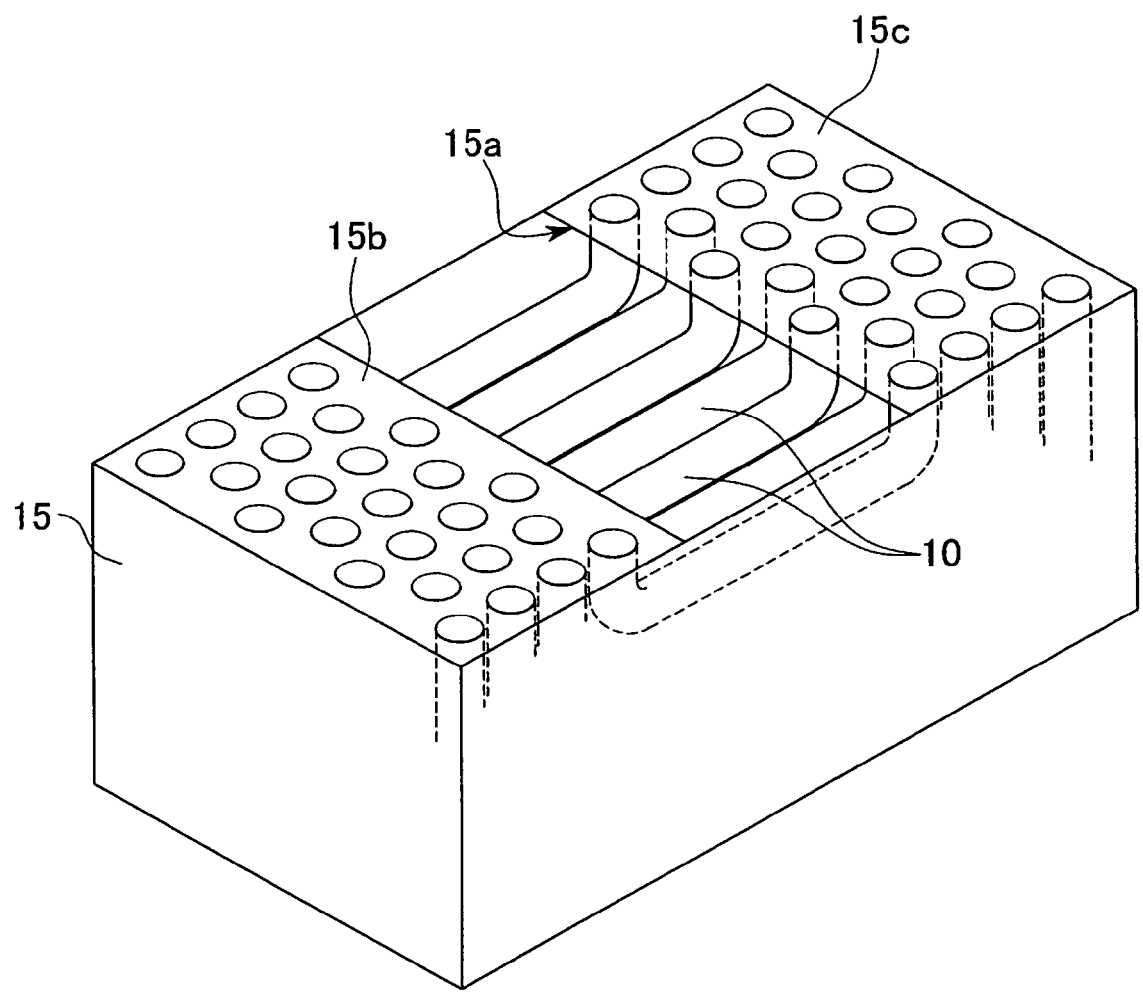
FIG. 12 is a perspective view of a water tank 15.

Next, a seventh embodiment of a humidifier according to the present invention is explained, with reference to FIG. 11 and FIG. 12. In the present embodiment also, components already described are labeled with the same reference symbols and further explanation omitted.

In the present embodiment, a moisture-permeable module 2 integrated with the water tank 15 as in the sixth embodiment is employed. However the fastening positions at both ends of the moisture-permeable tubes 10, and the position within the tank, differ.

As shown in FIG. 12, the water tank 15 is of rectangular parallelepiped shape which is long sideways, with an opening 15a provided in the center of the top face, with covers 15b and 15c provided at both sides. One end of each moisture-permeable tubes 10 is fastened to the cover 15b, and the other end is fastened to the cover 15c, and both ends of these moisture-permeable tubes 10 are bent to form a U-shape as shown in FIG. 11. Furthermore, a sensor is provided within the water tank 15 to indicate when the tank is empty of water.

The method of operation of the humidifier of the present embodiment is exactly the same as that for the sixth embodiment, and description is therefore omitted here. In the humidifier configured as explained above, swelling characteristics (the ability to swell when immersed in water, and to shrink when dried) of the moisture-permeable tubes 10 is considered. When the moisture-permeable tubes 10 are positioned linearly in the water tank, the moisture-permeable tubes 10 generate their own a tensile force when dry through lack of water, and stress occurs at the fastening parts at both ends. Therefore, it is necessary to join these parts strongly.

Conversely, in the present embodiment, since the moisture-permeable tubes 10 in the water tank are bent into a U-shape as shown in FIG. 11, even if the water tank 15 becomes empty of water and the moisture-permeable tubes shrink, they simply deform as shown by the two-dot chain line in FIG. 11, and fastening parts between the moisture-permeable tubes themselves and the water tank 15 are not subject to stress, and thus durability is improved. Moreover, since the fastening parts in the water tank 15 are above the water these parts need not be waterproofed, and the structure is thus simplified.

In the present embodiment, the moisture-permeable tubes 10 are bent into a U-shape. However provided that the total length of the moisture-permeable tubes 10 provided in the water tank exceeds the distance between the fastening positions at both ends, the aforementioned difficulty due to swelling is resolved.

Next, an eighth embodiment of a humidifier according to the present invention is explained, with reference to FIG. 13 through FIG. 16. In the present embodiment also, components already described are labeled with the same reference symbols and further explanation omitted.

Figure 13:
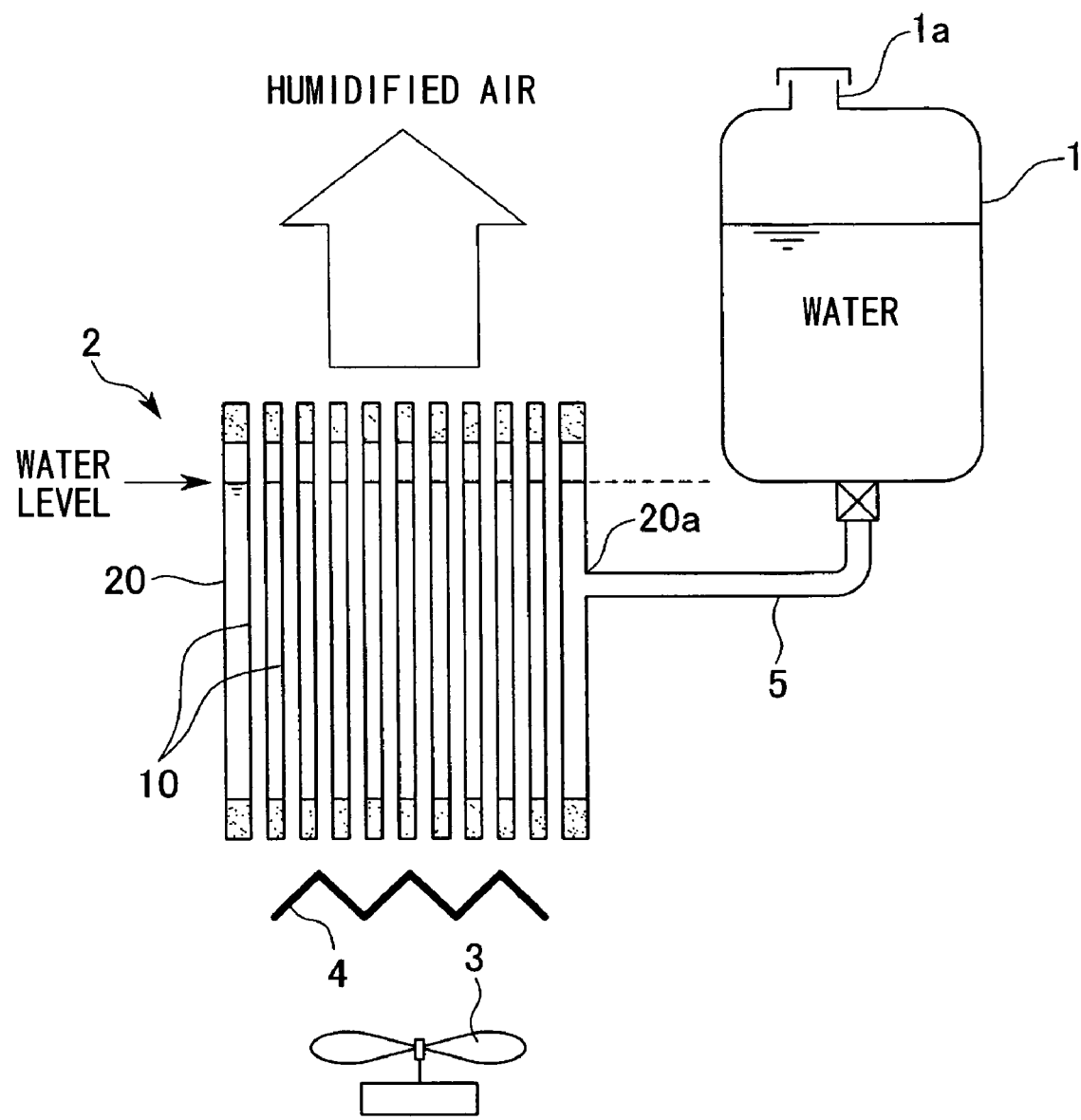
FIG. 13 is a drawing showing an eighth embodiment of the present invention, being a schematic configuration of the humidifier.

In the present embodiment, a moisture-permeable module 2 integrated with the water tank 15 as in the sixth and seventh embodiments is employed. As shown in FIG. 13, apart from a water tank 20 and a water inlet 20a, all other parts of the moisture-permeable module 2 of the present embodiment are closed and sealed, and the plurality of moisture-permeable tubes 10 cut to the same length are positioned within the water tank in a staggered pattern.

Figure 14:
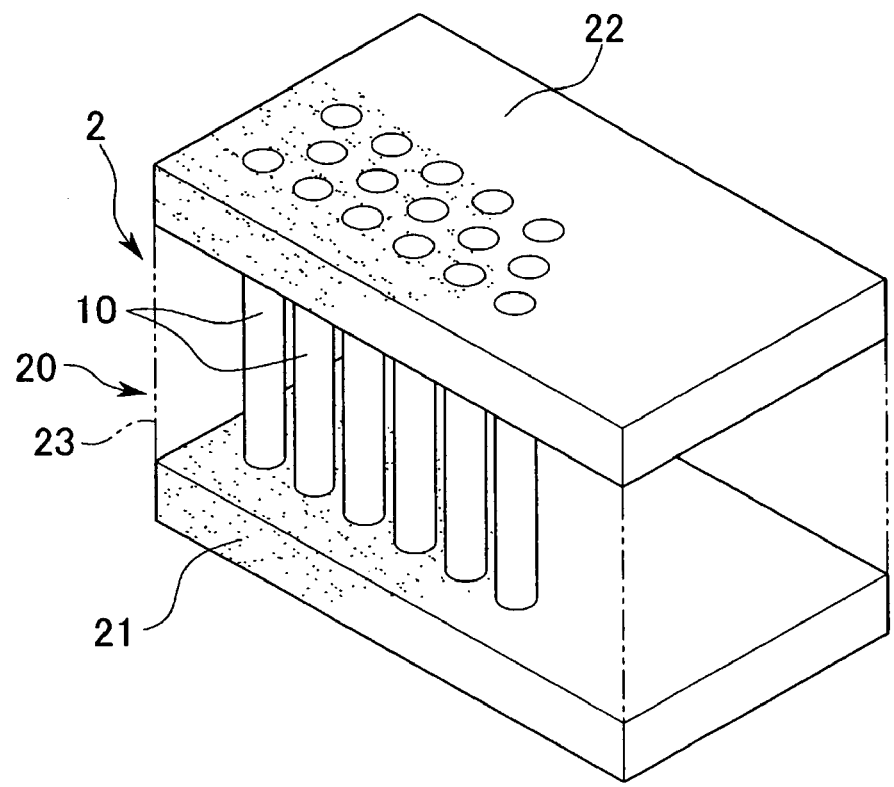
FIG. 14 is a perspective view of the moisture-permeable module 2.

As shown in FIG. 14, the water tank 20 comprises a base plate 21 holding one end of the plurality of moisture-permeable tubes 10, a top plate 22 holding the other end of the plurality of moisture-permeable tubes 10, and a tubular side wall 23 surrounding the moisture-permeable tubes 10 and bonded to the base plate 21 and the top plate 22 without gaps.

Figure 15:
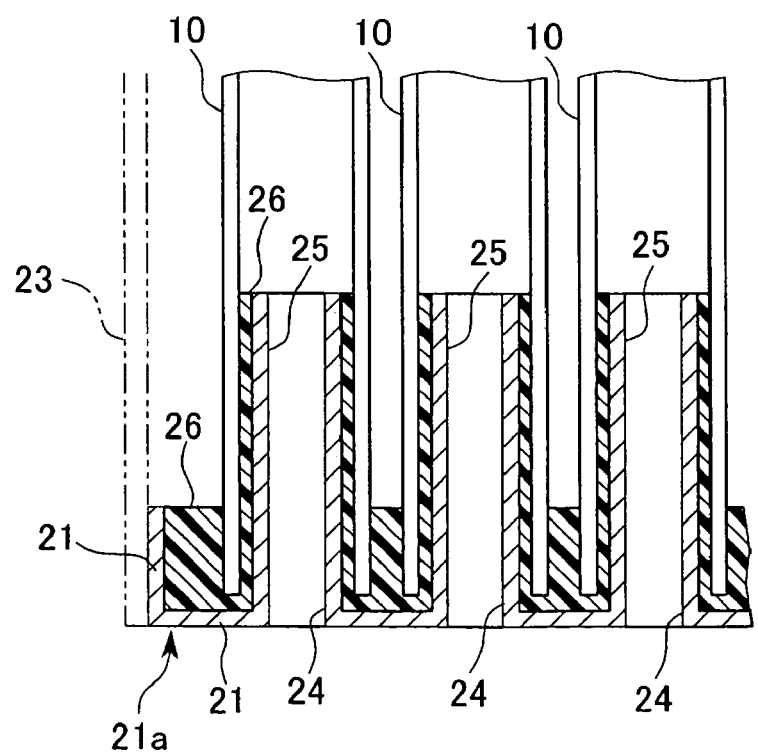
FIG. 15 is a cross-section of the principal part of a base plate 21.

The base plate 21 has a tray shape wherein the four edges are raised, and as shown in FIG. 15, holes 24 for ventilation are formed in the bottom face 21a being the lower face of the moisture-permeable module 2 in the same staggered pattern, and number, as the moisture-permeable tubes 10 (the top plate 22 is of the same shape although differing in orientation between top and bottom, and explanation is therefore omitted here). Cylindrical parts 25 communicating with the holes 24 are provided standing on the interior of the base plate 21 in the same staggered pattern of the moisture-permeable tubes 10. The ends of the moisture-permeable tubes 10 are temporarily fastened to the base plate 21 so as to attach the ends of the moisture-permeable tubes 10 to the cylindrical parts 25, and then bonded to the base plate 21 by pouring a resin adhesive 26 into the inside of the base plate 21. The adhesive 26 not only bonds the peripheral faces of the ends of the moisture-permeable tubes 10 in the inside of the base plate 21, but is also introduced into the space between the cylindrical parts 25 and the inner periphery of the moisture-permeable tubes 10 by capillary action, and strengthens the bond with the base plate 21, of the moisture-permeable tubes 10.

The plurality of moisture-permeable tubes 10 held at both ends by the base plate 21 and the top plate 22 respectively have a circular section, and have dimensions selected from an internal diameter of between 3 mm and 8 mm, preferably between 4 mm and 6 mm, a thickness of between 0.1 and 0.3 mm, preferably between 0.15 mm and 0.25 mm, and a length of between 80 mm and 300 mm, preferably between 100 mm and 250 mm, to ensure that the humidifying area per unit volume of the moisture-permeable module 2 (the surface area of the moisture-permeable tubes 10 included within the unit volume) is large. Moreover, this plurality of moisture-permeable tubes 10 is positioned in a staggered-pattern cross-section as seen from the length direction, and spacing between adjacent moisture-permeable tubes 10 is generally selected from between 0.3 mm and 1.0 mm, preferably between 0.5 mm and 0.7 mm, so that the spacing is neither too small, in which case the tubes contact each other and water does not readily enter, nor too large, in which case miniaturization of the moisture-permeable module 10 is no longer possible.

Commercially available urethane, epoxy, or silicon-based adhesives can be employed as the adhesive 26 for bonding the moisture-permeable tubes 10. Furthermore, the adhesive for the moisture-permeable module 2 is subject to a variety of conditions such as: the need for superior adhesion in the presence of water, and leak resistance; applicability of treatment for fungal resistance to ensure that fungi do not develop during humidification; an appropriate viscosity to ensure that it flows between the closely-spaced plurality of moisture-permeable tubes 10; and lack of odor following hardening and the like. However the most important are viscosity and pot life to ensure that the adhesive flows evenly between the closely-spaced plurality of moisture-permeable tubes 10. It is therefore desirable that an adhesive 26 having a maximum viscosity of 10000 cps, preferably a maximum of 3000 cps, be selected. Moreover, a pot life of at least 10 minutes is satisfactory, and a pot life of at least one hour is preferable.

The method of operation of the humidifier shown in FIG. 13 through FIG. 15 is the same as that for the sixth embodiment, and explanation is therefore omitted here. In the humidifier provided with the moisture-permeable module 2 having the aforementioned structure, in addition to obtaining the same effect as with each of the embodiments, the water tank 20 of the moisture-permeable module 2 is of the sealed type. Therefore water in the moisture-permeable module does not spill despite rough movement or tipping of the humidifier, and the interior of the apparatus, and the surroundings of its installation, do not become wet. Furthermore, the ability to freely position the moisture-permeable module 2 within the humidifier without consideration of the orientation of the moisture-permeable tubes 10 is beneficial in terms of miniaturizing the humidifier.

Figure 16:
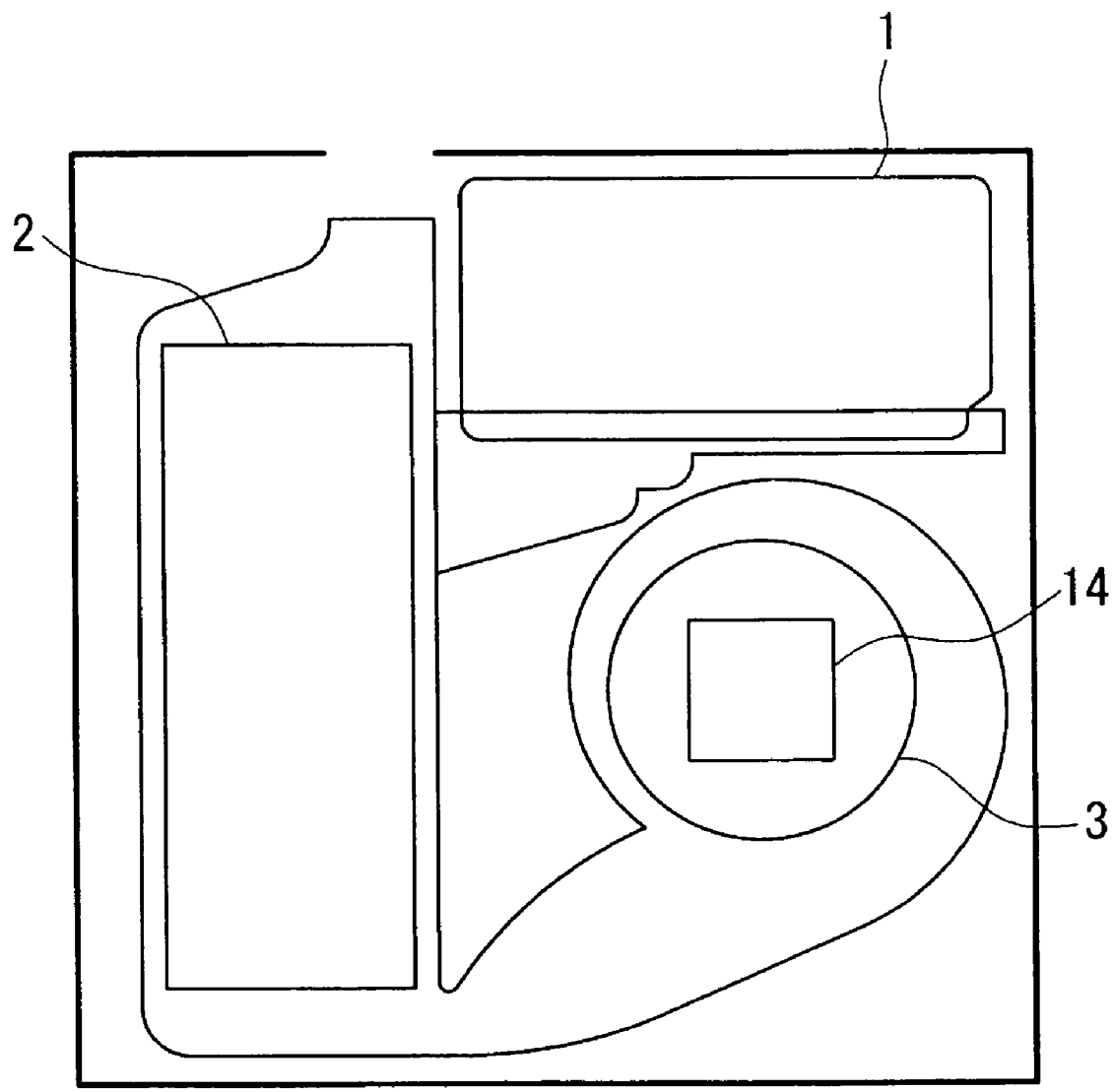
FIG. 16 is a side elevation showing the position of a more specific device of the humidifier provided with the moisture-permeable module 2 shown in the eighth embodiment.

FIG. 16 shows the positioning of actual devices within a humidifier provided with the moisture-permeable module 2 shown in the present embodiment.

The following is a description of modes of base plates and top plates differing in structure from the present embodiment, and methods of manufacture thereof.

First Mode

Figure 17A:
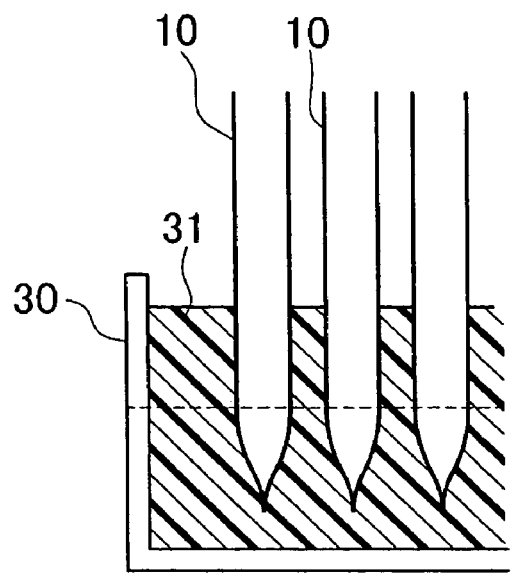
FIG. 17A and FIG. 17B are cross-sections of the principal part of a mode of a base plate of a structure differing from FIG. 15.
Figure 17B:
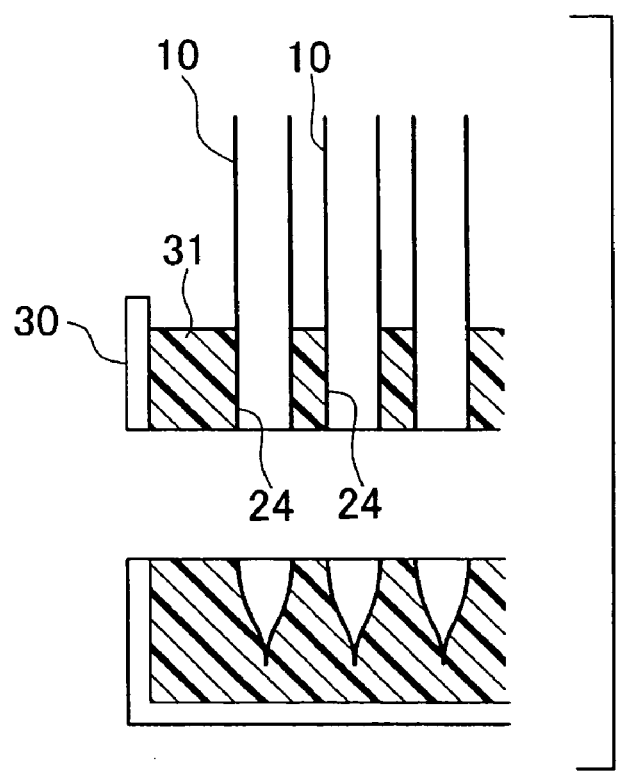

At first, the end of the moisture-permeable tubes 10 are pressed flat and sealed. As shown in FIG. 17A, the plurality of moisture-permeable tubes 10 are bundled together with these pressed ends downwards, and these ends are held positioned within the mold tray 30. Adhesive 31 is then poured into the interior of the mold tray 30. When the adhesive 31 has hardened, the hardened adhesive 31 is then cut with a bandsaw or the like to divide it into top and bottom as shown in FIG. 17B. The position at which the cut is made is determined in accordance with the absolute need for the part remaining after bonding to the moisture-permeable tubes 10, to be of sufficient thickness to ensure sufficient strength as the base plate 21 (or the top plate 22) forming a part of the water tank 20, and the ends of the moisture-permeable tubes 10 renewed by the cutting to be open at the cutting face.

The part remaining after the bottom is cut-off forms the base plate 21 (or the top plate 22). The moisture-permeable tubes 10 are bonded only at the peripheral faces of their ends, with the hardened adhesive 31.

Second Mode

Figure 18A:
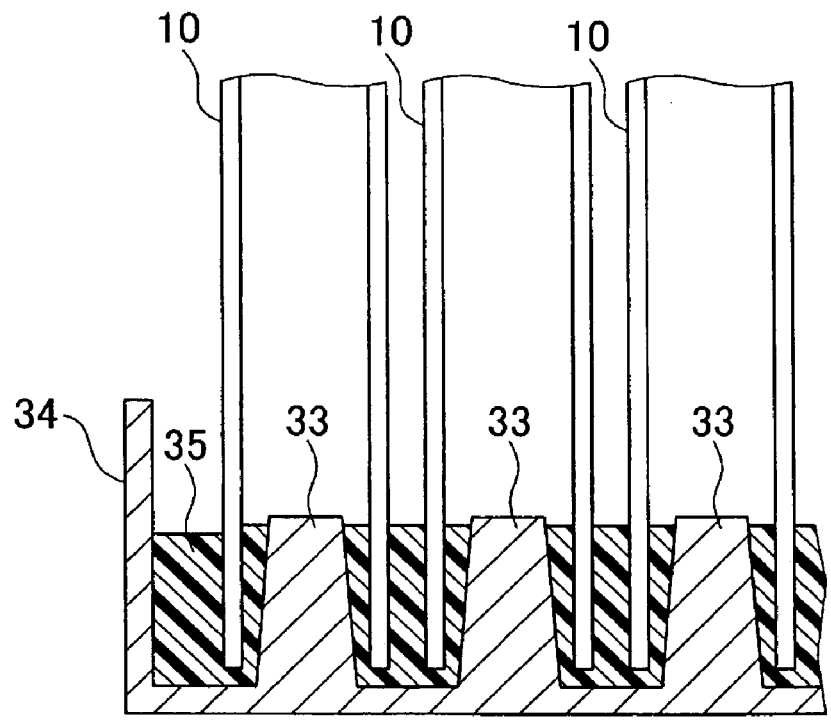
FIG. 18A and FIG. 18B are cross-sections of the principal part of a mode of a base plate of structure differing from FIG. 15 and FIG. 17.
Figure 18B:
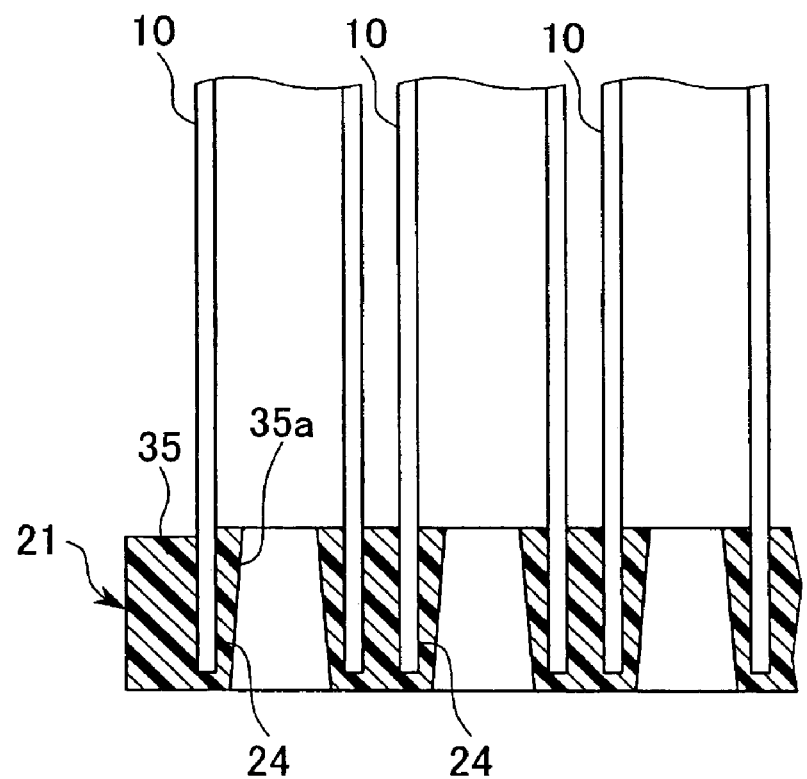

Firstly, as shown in FIG. 18A, a mold tray 34 is prepared which has a large number of cone-shaped projections 33 projecting from the bottom face in the interior of the mold tray 34, and each end of the plurality of moisture-permeable tubes 10 is attached and held to a projection 33. At this time, care is required to ensure that the ends of the moisture-permeable tubes 10 do not completely butt-up against the bottom face in the interior of the mold tray 34, and to ensure that a small gap is provided between the projections 33 and the inner peripheral face of the moisture-permeable tubes 10, in order to facilitate introduction of the adhesive into the space between the projections 33 and the ends of the moisture-permeable tubes 10 by capillary action. The adhesive 35 is then poured into the interior of the mold tray 34. When the adhesive 35 hardens, the integrated hardened adhesive 35 and moisture-permeable tubes 10 are separated from the mold tray 34 as shown in FIG. 18B.

The part separated from the mold tray 34 forms the base plate 21 (or the top plate 22). The ends of the moisture-permeable tubes 10 are bonded to the base plate 21 (or the top plate 22) by the hardened adhesive 35 not only on the exterior face, but also by the hardened adhesive (resin body) 35a having penetrated into the interior. The hardened adhesive 35a having penetrated into the interior of the moisture-permeable tubes 10 not only provides adhesive strength, but also impedes crushing of the moisture-permeable tubes 10 from the inside prevents peeling from the adhesive 35 forming caps, and prevents leakage of water.

Figure 19:
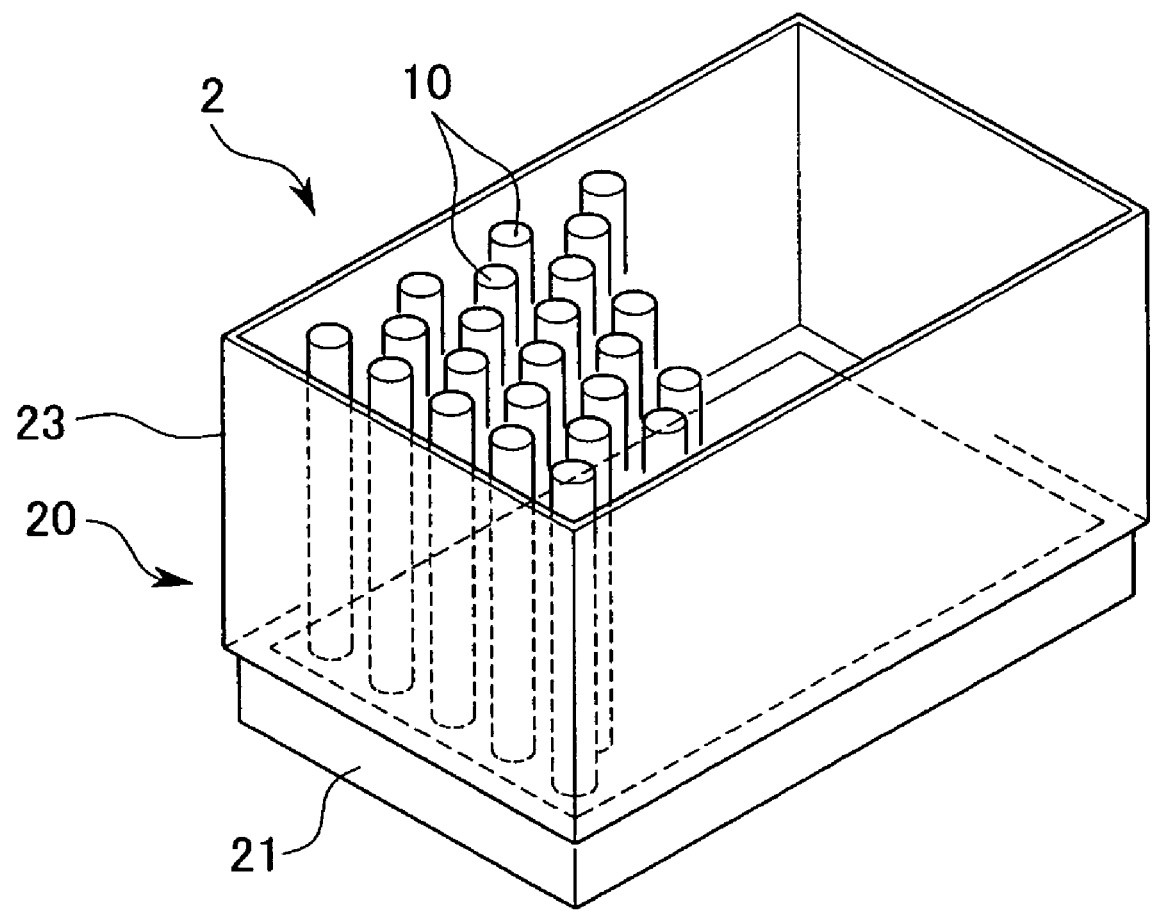
FIG. 19 is a perspective view of an open-type tank 20.

The water tank 20 need not be restricted to a sealed type, and may be of the open type wherein the top is open as shown in FIG. 19. In this case, the structure of the base plate 21 of the eighth embodiment, or the structure of the First Mode or Second Mode, may be used unchanged for the base of the water tank 20.

EXAMPLES

The following shows the results of an investigation of water leakage, for a plurality of trial moisture-permeable modules 2 shown in the eighth embodiment wherein the type of the adhesive 26 (see below) is changed. More specifically, the investigation of water leakage involved introduction of water as necessary to maintain a water level (see FIG. 13) of 200 mm in the various trial moisture-permeable modules 2, and the observation of whether or not water leaked from the boundary of the ends of the moisture-permeable tubes 10 and the adhesive 26. When water was first introduced, a water head pressure of 200 mm was applied to the moisture-permeable tubes 10 and no significant deformation or crushing or the like were found at the bottom ends.

Types of Adhesive
1. Sanyu Resin urethane blend resin manufactured by Sanyu Rec Co., Ltd.; Product No. SU-2153-9 (viscosity: 1230 cps; pot life: 120 minutes)
2. Sanyu Resin urethane blend resin manufactured by Sanyu Rec Co., Ltd.; Product No. UF-820 (viscosity: 200 cps; pot life: 30 minutes)
3. Injectable polyurethane resin manufactured by H&K Ltd.; Product No. T-143 (viscosity: 1500 cps; pot life: 20 minutes)
4. Epoxy resin adhesive manufactured by Cemedine Co., Ltd.; Product No. T-1565 (viscosity: 1500 cps; pot life: 30 minutes)
5. Acrylic resin adhesive manufactured by Cemedine Co., Ltd.; Product No. Y-616 (viscosity: 5000 cps; pot life: 4 minutes)
6. Two-pot RTV silicone rubber manufactured by Toray Dow Corning Silicone Co., Ltd.; Product No. CY51-038RTV (viscosity: 500 cps; pot life: 20 minutes)
7. Single-pot sealant manufactured by Toray Dow Corning Silicone Co., Ltd.; Product No. SE9186LRTV (viscosity: 25000 cps; pot life: 7 minutes)

Adhesives 1, 2, and 3 are two-pot urethane adhesives, 4 is a two-pot epoxy adhesive, 5 is a two-pot acrylic adhesive, 6 is a two-pot silicone adhesive, and 7 is a single-pot silicone adhesive.

As shown in FIG. 20, water leakage was not found, and excellent performance was verified, in all trial items except those in which silicone-type adhesives were employed. Moreover, exactly the same investigation of water leakage was conducted for the First Mode and Second Mode of the moisture-permeable module 2 shown in the eighth embodiment, and excellent performance was also verified.

Figure 21:
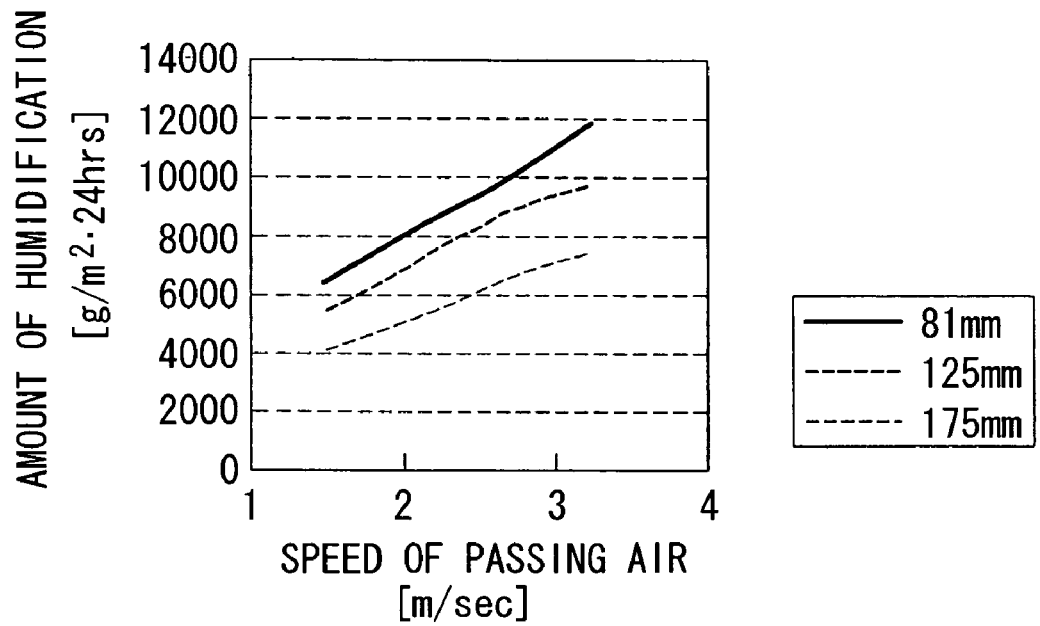
FIG. 21 is a graph showing the results of verification of the amount of humidification for a plurality of moisture-permeable modules 2 shown in the eighth embodiment of the present invention, trial-manufactured employing a variety of lengths of moisture-permeable tubes 10, each module containing 468 tubes.

Next, as a representative example, a plurality of trial moisture-permeable modules 2 shown in the eighth embodiment were manufactured, with various lengths of moisture-permeable tubes 10 (internal diameter: 4.6 mm; external diameter: 5.0 mm; and thickness: 0.2 mm), each module containing 468 tubes; however, the present invention is not limited to this example. The results of investigation of the amount of humidification with these trial moisture-permeable modules 2 are shown in FIG. 21. More specifically, the investigation involved introduction of water as necessary to maintain a constant water level (see FIG. 13) in the various trial moisture-permeable modules 2, and the measurement of the reduction in the water in the tank 1 when air at a temperature of 20° C. and 40% humidity was fed through the moisture-permeable tubes 10. FIG. 21 shows the relationship between the speed at which the air passes through the moisture-permeable tubes 10, and the amount of humidification per unit surface area of the moisture-permeable tubes 10 per 24 hours (the amount by which the water is reduced, that is, the amount of water permeating the moisture-permeable tubes).

As shown in the graph in FIG. 21, at a length of the moisture-permeable tubes 10 of 81 mm, making the surface area of the tubes 0.6 $m^2$, and a speed at which the air passes of 3.2 m/sec, an amount of humidification of 12000 $g/m^2$ per 24 hours was recorded. At a length of the moisture-permeable tubes 10 of 125 mm, making the surface area of the tubes 0.9 $m^2$, and a speed at which the air passes of 3.2 m/sec, an amount of humidification of 10000 $g/m^2$ per 24 hours was recorded. At a length of the moisture-permeable tubes 10 of 175 mm, making the surface area of the tubes 1.2 $m^2$, and a speed at which the air passes of 3.2 m/sec, an amount of humidification of 7500 $g/m^2$ per 24 hours was recorded. The longer the tubes are, the greater the surface area becomes; however, at a speed of passing air of 3.2 m/sec or lower, it is made clear that the efficiency is not enhanced in relation to the length of the tubes, since the amount of vapor in air nears saturation at the exits of the tubes although the difference in concentration at the interfaces provided by the tubes between water and air is largest at the entrance of the tubes.

Figure 22:
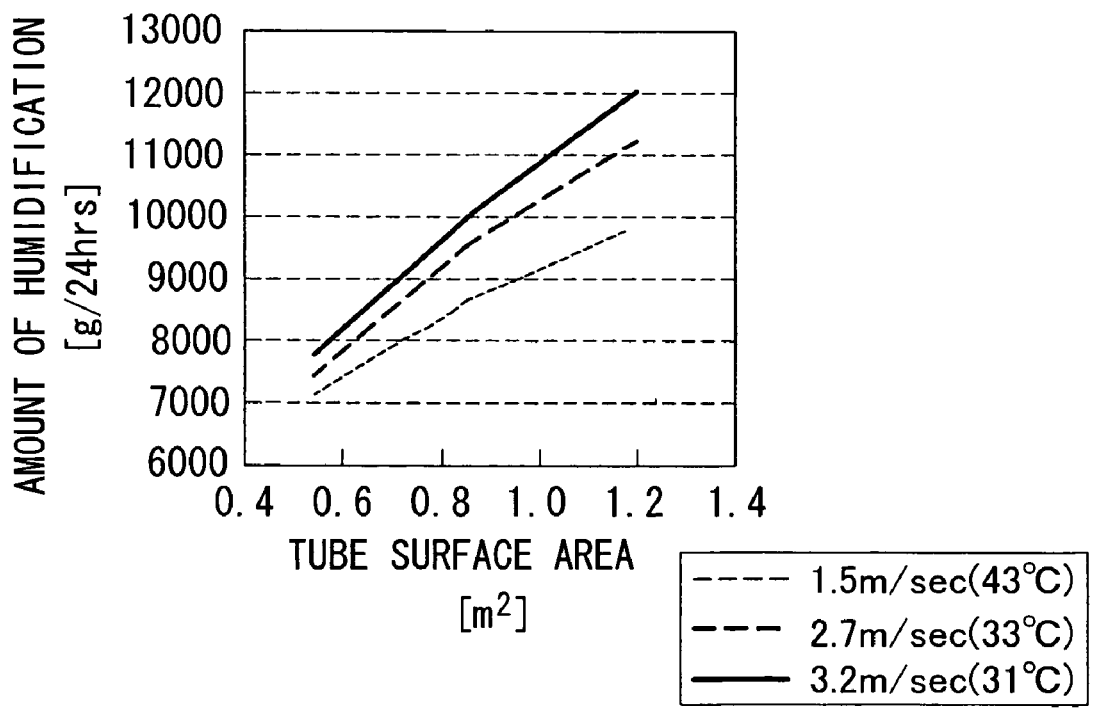
FIG. 22 is a graph showing the results of verification of the amount of humidification when heated air is fed for a plurality of moisture-permeable modules 2 shown in the eighth embodiment of the present invention, trial-manufactured employing a variety of lengths of moisture-permeable tubes 10, each module containing 468 tubes.

Next, a plurality of trial moisture-permeable modules 2 shown in the eighth embodiment were manufactured, with various lengths of moisture-permeable tubes 10 (internal diameter: 4.6 mm; external diameter: 5.0 mm; and thickness: 0.2 mm), each module containing 468 tubes; however, the present invention is not limited to this example. The results of investigation of the amount of humidification when heated air was fed through the moisture-permeable tubes 10 are shown in FIG. 22. More specifically, the investigation involved introduction of water as necessary to maintain a constant water level (see FIG. 13) in the various trial moisture-permeable modules 2, the measurement of the temperature of air heated with a heater 4 and fed to the moisture-permeable tubes 10, and the measurement of the reduction in the water in the tank 1 when air was fed through the moisture-permeable tubes 10. FIG. 22 shows the relationship between the surface area of the moisture-permeable tubes 10, and the amount of humidification of the moisture-permeable tubes 10 per 24 hours (the amount by which the water is reduced, that is, the amount of water permeating the moisture-permeable tubes).

As shown in the graph in FIG. 22, the temperature of air varies from 43° C. to 33° C. to 31° C. depending on the speed of air passing through the tubes; the lower the speed of air passing through the tubes is, the higher the temperature of air is. At a surface area of the moisture-permeable tubes 10 of 0.6 $m^2$, an amount of humidification of 7200 to 7700 $g/m^2$ per 24 hours depending on the temperature of air was recorded. At a surface area of the moisture-permeable tubes 10 of 0.9 $m^2$, an amount of humidification of 8700 to 10200 $g/m^2$ per 24 hours depending on the temperature of air was recorded. At a surface area of the moisture-permeable tubes of 1.2 $m^2$, an amount of humidification of 10000 to 12000 $g/m^2$ per 24 hours depending on the temperature of air was recorded. By raising the temperature of air using the heater, the amount of humidification can be increased even at a speed of passing air of 3.2 m/sec. The humidification capacity can be increased by adjusting the speed of air passing through the tubes and the temperature of air fed to the module.

What is claimed is:

1. A moisture-permeable module wherein a moisture-permeable polyurethane obtained by using as raw materials, at least an isocyanate component, a diol as a chain extender, and polyethylene glycol as a polyol component, and reacting these raw materials, is molded into a tube to give a moisture-permeable tube,
   wherein a plurality of said moisture-permeable tubes are held bundled together, and a portion of said plurality of moisture-permeable tubes except for both ends is positioned in the interior of a water tank,
   wherein a part of said water tank is molded from resin, the ends of said moisture-permeable tubes are bonded together during a process of hardening of said resin, and the interior of each moisture-permeable tube is exposed to the exterior of said water tank via holes formed in part of said water tank,
   wherein a resin body having cylindrical parts communicating with the holes is formed inside the ends of said moisture-permeable tubes to prevent deformation of said moisture-permeable tubes inwards, and
   wherein cylindrical parts communicating with said holes are installed standing on an interior face of said water tank, and the ends of said moisture-permeable tubes are bonded to said cylindrical parts, to thereby connect said moisture-permeable tubes to said water tank.

2. A moisture-permeable module according to claim 1, wherein adhesive is applied to the interior face of said water tank to bond said water tank to said moisture-permeable tube.

3. A moisture-permeable module wherein a moisture-permeable polyurethane obtained by using as raw materials, at least an isocyanate component, a diol as a chain extender, and polyethylene glycol as a polyol component, and reacting these raw materials, is molded into a tube to give a moisture-permeable tube,
   wherein a plurality of said moisture-permeable tubes are held bundled together, and a portion of said plurality of moisture-permeable tubes except for both ends is positioned in the interior of a water tank,
   wherein a part of said water tank is molded from resin, the ends of said moisture-permeable tubes are bonded together during a process of hardening of said resin, and the interior of each moisture-permeable tube is exposed to the exterior of said water tank via holes formed in part of said water tank,
   wherein a resin body having cylindrical parts communicating with the holes is formed inside the ends of said moisture-permeable tubes to prevent deformation of said moisture-permeable tubes inwards, and
   wherein adhesive is filled between said cylindrical part and said moisture-permeable tube attached to said cylindrical part to bond both together.

* * * * *